US007868087B2

(12) United States Patent
Mayes et al.

(10) Patent No.: US 7,868,087 B2
(45) Date of Patent: Jan. 11, 2011

(54) GRAFT COPOLYMERS, METHODS FOR GRAFTING HYDROPHILIC CHAINS ONTO HYDROPHOBIC POLYMERS, AND ARTICLES THEREOF

(75) Inventors: Anne M. Mayes, Waltham, MA (US); Jonathan F. Hester, Hudson, WI (US); Pallab Banerjee, Boston, MA (US); Ariya Akthakul, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 878 days.

(21) Appl. No.: 11/541,629

(22) Filed: Sep. 29, 2006

(65) Prior Publication Data

US 2007/0219322 A1     Sep. 20, 2007

Related U.S. Application Data

(63) Continuation of application No. 09/951,125, filed on Sep. 12, 2001, now abandoned.

(60) Provisional application No. 60/231,599, filed on Sep. 11, 2000.

(51) Int. Cl.
  *B01D 67/00* (2006.01)
  *B01D 69/02* (2006.01)
  *B01D 71/34* (2006.01)
  *B01D 71/78* (2006.01)

(52) U.S. Cl. ............ 525/54.1; 525/245; 525/256; 525/299; 525/302; 525/309; 210/500.27; 210/500.35; 210/500.42

(58) Field of Classification Search ............ 525/70, 525/76, 245, 54.1, 256, 299, 302, 309; 210/500.27, 210/500.35, 500.42
See application file for complete search history.

(56) References Cited

U.S. PATENT DOCUMENTS

| 3,901,810 | A | * | 8/1975 | Brooks et al. | 210/500.28 |
|---|---|---|---|---|---|
| 4,377,010 | A | * | 3/1983 | Fydelor et al. | 623/1.49 |
| 4,752,624 | A | | 6/1988 | Kim et al. | |
| 4,861,830 | A | | 8/1989 | Ward, Jr. | |
| 4,886,836 | A | | 12/1989 | Gsell et al. | |
| 5,028,332 | A | * | 7/1991 | Ohnishi | 210/500.34 |
| 5,066,401 | A | | 11/1991 | Muller et al. | |
| 5,190,989 | A | | 3/1993 | Himori | |
| 5,470,892 | A | | 11/1995 | Gupta et al. | |
| 6,207,749 | B1 | | 3/2001 | Mayes et al. | |
| 6,413,621 | B1 | * | 7/2002 | Mayes et al. | 428/212 |
| 6,509,098 | B1 | * | 1/2003 | Merrill et al. | 428/413 |
| 2002/0155311 | A1 | | 10/2002 | Mayes et al. | |

FOREIGN PATENT DOCUMENTS

| JP | 61007961 | | 7/1987 |
|---|---|---|---|
| WO | WO 98/08595 | A2 | 3/1998 |
| WO | WO 98/08595 | A3 | 3/1998 |
| WO | WO 99/52560 | * | 10/1999 |
| WO | WO 99/54365 | A1 | 10/1999 |
| WO | WO 02/022712 | A2 | 3/2002 |
| WO | WO 02/022712 | A3 | 3/2002 |

OTHER PUBLICATIONS

Beers et al., "The synthesis of densely grafted copolymers by atom transfer radical polymerization," Macromolecules, vol. 31, No. 26, pp. 9413-9415, 1998.
Beihoffer et al., "Hydrophilic modification of engineering polymers," Polymer, vol. 27, pp. 1626-1632, Polymer, Oct. 1986.
Dasgupta, "Surface modification of polyolefins for hydrophilicity and bondability: ozonization and grafting hydrophilic monomers on ozonized polyolefins", Journal of Applied Polymer Science, vols. 41, pp. 233-248, 1990.
Downes et al., "Modifications of the hydrophilicity of heterocyclic methacrylate copolymers for protein release", Biomaterials, vol. 16, No. 18, pp. 1417-1421, 1995.
Hester et al., "Preparation of protein-resistant surfaces on poly(vinylidene fluoride) membranes via surface segregation", Macromolecules, vol. 32, pp. 1643-1650, 1999.
Hopkinson, et al., Isotopic labelling and composition dependence of interaction parameters in polyethylene oxide/polymethyl methacrylate blends, *Polymer*, vol. 36, No. 18, pp. 3523-3531, 1995.
Israelachvili, Jacob N., et al. "Contact Angles on Chemically Heterogeneous Surfaces," *Langmuir*, vol. 5, p. 288-289, 1989.
Israels et al., "pH-controlled gating in polymer brushes", Macromolecules, vol. 27, pp. 6679-6682, 1994.
Ito et al., "pH-sensitive gating by conformational change of a polypeptide brush grafted onto a porous polymer membrane", J. Am. Chem. Soc., 1619-1623, 1997.
Kim, C. K., et al., The Changes of Membrane Performance with Polyamide Molecular Structure in the Reverse Osmosis Process, *J. Memb. Sci.*, vol. 165, p. 189-199, 2000.
Mika et al., "A new class of polyelectrolyte-filled microfiltration membranes with environmentally controlled porosity", Journal of Membrane Science, vol. 108, pp. 37-56, 1995.
Nunes, Suzana Pereira, et al., "Dense Hydrophilic Composite Membranes for Ultrafiltration," *J. Memb. Sci.*, vol. 106, p. 49-56, 1995.
Paik, Hyun-Jong, et al., Synthesis and Characterization of Graft Copolymers of Poly(vinyl chloride) with Styrene and (Meth)acrylates by Atom Transfer Radical Polymerization, *Macromol. Rapid Comm.*, vol. 19, p. 47-52, 1988.

(Continued)

*Primary Examiner*—Jeffrey C Mullis
(74) *Attorney, Agent, or Firm*—Wolf, Greenfield & Sacks, P.C.

(57) ABSTRACT

The present invention relates to synthetic methods for grafting hydrophilic chains onto polymers, particularly hydrophobic polymers such as poly(vinyl chloride) (PVC), poly(vinylidene fluoride) (PVDF), and chlorinated polypropylene (cPP). Resulting polymers include comb polymers which can have a microphase-separated structure of hydrophilic domains provided by the hydrophilic chains. Articles prepared from these comb polymers, particularly derived from PVDF, include membranes for water filtration in which the hydrophilic domains provide a pathway for water transport. PVC can be plasticized by grafting the PVC with hydrophilic chains. In addition, such articles, particularly articles having biomedical applications, can display anti-thrombogenic properties.

7 Claims, 12 Drawing Sheets

OTHER PUBLICATIONS

Walton et al., "Entropically driven segregation in blends of branced and linear polymers", Physical Review Letters, vol. 54, No. 3, pp. 2811-2815, Sep. 1996.

Wang et al., "Synthesis of EPDM-g-PMMA through atom transfer radical polymerization," Polymer, vol. 40, pp. 4515-4520, 1999.

* cited by examiner

US 7,868,087 B2

GRAFT COPOLYMERS, METHODS FOR GRAFTING HYDROPHILIC CHAINS ONTO HYDROPHOBIC POLYMERS, AND ARTICLES THEREOF

RELATED APPLICATIONS

This application is a continuation of U.S. patent application Ser. No. 09/951,125, filed Sep. 12, 2001, which claims priority to U.S. Provisional Patent Application Ser. No. 60/231,599, filed Sep. 11, 2000, both of which are incorporated herein by reference.

GOVERNMENT SPONSORSHIP

This invention was sponsored by the Navy under Grant No. N00014-99-1-0310. The government has certain rights in the invention.

FIELD OF THE INVENTION

The present invention relates to new synthetic methods for grafting hydrophilic chains onto polymers, particularly hydrophobic polymers. Graft copolymers resulting from these synthetic methods and articles prepared from these polymers, including membranes and articles having plasticizing and anti-thrombogenic properties, are also described herein.

BACKGROUND OF THE INVENTION

Commercially available polymers having hydrophilic properties are of great utility, particularly in areas such as such as improved resistance to the adsorption of oils and proteins, biocompatibility, reduced static charge build-up, and improved wettability to materials such as glues, inks, paints and water. Applications for such polymers include water filtration membranes and biocompatible medical devices and articles.

In many applications, polymers having optimal mechanical, thermal and chemical stability are hydrophobic. Because a hydrophobic polymer or article is difficult to wet and is susceptible to fouling, the article can be coated with a hydrophilic species, either covalently or by adsorption, or otherwise treated to provide hydrophilic properties. Articles coated in this manner require additional processing steps, which increase the manufacturing cost of the article. Where the article has membrane applications, the coating may reduce pore size and thus reduced permeability. In addition, coatings not covalently attached may suffer from insufficient chemical or mechanical stability. Even if the coatings are covalently attached coatings, such as those prepared by surface graft polymerization, residual reactants resulting from the reaction for covalent attachment require extraction prior to use.

Moreover, surface coverage of graft-polymerized coatings is difficult to control. Coating of the membrane separation surface does not prevent fouling of internal pore channels.

The development of graft copolymers afforded a possibility to overcome many of the disadvantages discussed above. A "graft copolymer" is produced by covalently bonding a species to be grafted, also referred to as a comonomer, to a parent polymer which provides the backbone in the graft copolymer. Graft copolymers derived from a parent polymer are typically used for providing a material with specific properties while retaining desirable properties of the parent polymer.

The synthesis of graft copolymers is most commonly accomplished via free-radical reactions initiated by exposing the polymer to ionizing radiation and/or a free-radical initiator in the presence of the comonomer. Free radical syntheses in this manner, however, can be an uncontrolled process. Numerous radicals are present not only on the polymer but also on the comonomer, which can undergo free-radical homopolymerization resulting in a mixture of homopolymers and graft copolymers. Thus, a significant disadvantage of these free-radical techniques is that the product is typically a mixture of graft copolymer and homopolymer. Moreover, polymer backbone degradation and/or crosslinking can occur as a result of uncontrolled free-radical production.

Thus, there exists a need to prepare graft copolymers via a facile, inexpensive process.

SUMMARY OF THE INVENTION

One aspect of the present invention provides a method comprising the steps of providing a catalyst comprising a transition metal halide coordinated to at least one ligand, and initiating, via the catalyst, a reaction between a vinyl group and a parent polymer comprising a repeat unit including a secondary halogen atom.

Another aspect of the invention provides an article comprising a microphase-separated comb polymer having a backbone repeat unit including a secondary carbon atom. A plurality of the secondary carbon atoms in the polymer are directly bonded to a hydrophilic side chain and the polymer has hydrophilic domains provided by the side chains.

Another aspect of the present invention provides an article comprising a comb polymer having a hydrophobic backbone in which a backbone repeat unit comprises a secondary carbon atom directly bonded to a halogen atom. A plurality of hydrophilic side chains are bonded to secondary carbon atoms to the backbone. The comb polymer backbone has a molecular weight no smaller than a molecular weight of the backbone of a corresponding parent polymer.

Another aspect of the present invention provides a membrane for water filtration. The membrane comprises a microphase-separated polymer including hydrophilic domains having a mean diameter of less than about 3 nm, in which the hydrophilic domains provide transport pathways for water.

Another aspect of the present invention provides a membrane for water filtration comprising a microphase-separated polymer including hydrophilic domains. The membrane is self-supporting.

Another aspect of the present invention provides a method for water filtration.

The method comprises the steps of providing a membrane comprising a microphase-separated polymer including hydrophilic domains, and allowing water to pass completely through the membrane via the hydrophilic domains.

Another aspect of the present invention provides an article comprising a graft copolymer having a hydrophobic backbone. A backbone repeat unit comprises a secondary carbon atom directly bonded to a halogen atom. The article also comprises a plurality of hydrophilic side chains bonded to the secondary carbon atoms of the backbone. The comb polymer backbone has a molecular weight no smaller than a molecular weight of the backbone of a corresponding parent polymer. The article is resistant to cell and protein adsorption such that the article absorbs less than 90% of protein absorbed by a corresponding parent polymer. In another embodiment the plurality of side chains comprises a plasticizer such that a glass transition temperature of the comb polymer is at least 5°

C. less than that of a corresponding parent polymer. In yet another embodiment, the article further comprises cell-binding ligands attached to between 1 and 100% of the hydrophilic side chains of the graft copolymer.

Another aspect of the present invention provides an article comprising a graft copolymer. The graft copolymer comprises a backbone comprising a polysulfone or polycarbonate derivative. The article further comprises hydrophilic side chains directly bonded to oxyphenylene units of the backbone. The graft copolymer backbone has a molecular weight no smaller than a molecular weight of a corresponding parent polymer backbone.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
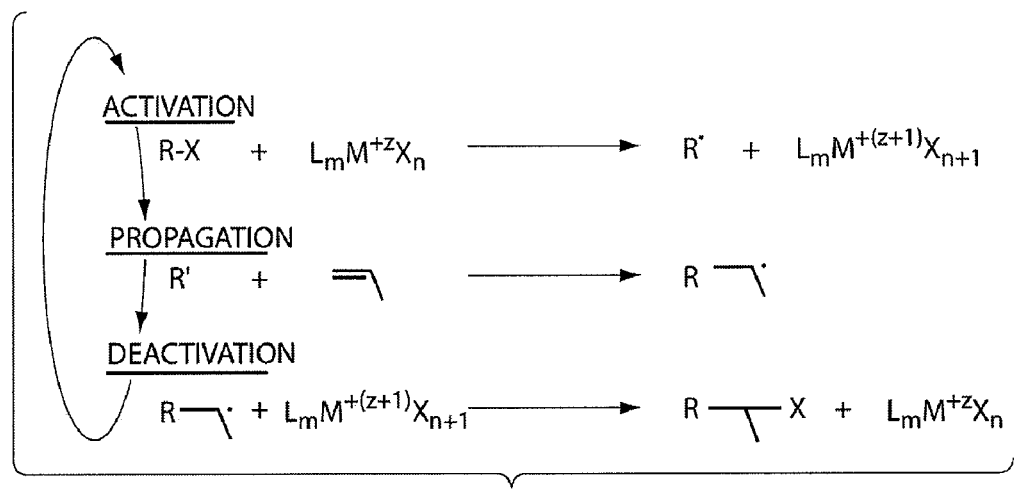
FIG. 1 shows a general scheme for preparing grafted copolymers via ATRP according to the present invention, involving addition of a vinyl monomer to a polymer repeat unit denoted as "[R—X]", in which a transition metal halide catalyst is denoted as $M^{+z}X_n$ and a coordinating ligand is denoted as "$L_m$"

The present invention relates to a method for preparing graft copolymers via a controlled free-radical process. In addition, the preparation involves a single-step synthetic process. The invention also provides articles comprising graft copolymers, in which a hydrophilic species is grafted onto a hydrophobic polymer, thus, providing a method for preparing biocompatible biomedical devices. Other graft copolymers described herein are microphase-separated, with hydrophilic domains provided by grafted hydrophilic species. Such copolymers can be used to prepare novel membrane materials for water filtration in which the hydrophilic domains provide the primary mode of transport for water through the membrane.

One aspect of the present invention provides a method for the facile synthesis of grafted copolymers. "Grafting" involves the provision of a parent polymer having reactive sites in some or all of the repeat units, and adding a species to be grafted (also known as a comonomer) to the parent polymer at the reactive sites. Graft copolymers derived from a parent polymer allow generation of a material with specific properties while retaining desirable properties of the parent polymer.

The present invention advantageously provides a grafting reaction which can be carried out in one synthetic step while essentially eliminating the formation of undesired species such as homopolymers and chain degradation products, which can result from uncontrolled free-radical reactions. In one embodiment, the method involves a reaction known as an atom transfer radical polymerization (ATRP), which is a "controlled" free-radical polymerization. This reaction is controlled because free radical concentration is kept low and mainly centered on the parent polymer, preventing the occurrence of numerous undesired reactions. Evidence for eliminating homopolymer formation is noted, for example, in the molecular weight discussions or Example 1.

Although ATRP techniques have been previously used for preparing grafted copolymers, it was commonly believed that the parent polymer required very reactive groups to serve as the reactive sites. For many polymers, direct reaction of a vinyl group with a halogen atom, such as chlorine or fluorine bonded to a secondary carbon atom has not been feasible. Thus, previous ATRP reactions for grafting involved the extra step of substituting secondary halogen atoms with more reactive groups, such as a chloroacetate group. For example, Paik et al. (*Macromolecules Rapid Communications* 1998, 19, 47) reported grafting styrene and various methyl methacrylate side chains onto a polyvinyl chloride-based macroinitiator, in which the macroinitiator was modified to incorporate reactive chloroacetate groups as reactive sites for ATRP polymerization of the monomers. Indeed, Paik et al. stated that "the secondary chlorine on the PVC backbone is too strongly bonded to initiate the polymerization by reaction with Cu(I) complex."

Advantageously, the method of the present invention involves providing a catalyst comprising a transition metal halide coordinated to at least one ligand. The method further involves initiating, via the catalyst, a reaction between a vinyl group and a parent polymer comprising a repeat unit including a secondary halogen atom (i.e. a halogen atom bonded to a secondary carbon atom). In one embodiment, the repeat unit includes the polymer backbone. "Backbone" refers to the longest continuous bond pathway of a polymer. In this embodiment, the repeat unit includes a secondary carbon atom situated in the backbone in which the secondary carbon atom is bonded to the halogen atom. Thus, the present invention allows the direct use of polymer having secondary halogen atoms without the extra step of substituting the halogen atoms with more reactive leaving groups.

FIG. 1 shows a general scheme for preparing grafted copolymers via ATRP according to the present invention, outlining activation-propagation-deactivation processes for addition of a vinyl monomer to a polymer repeat unit denoted as "[R—X]". "R" is a secondary carbon atom and X is a halogen atom, i.e. X is a secondary halogen atom. "R" can be bonded to two halogen atoms or to a single halogen atom plus a second species. For clarity, only one R—X bond is shown here. The vinyl monomer can be bonded to another organic group, R'. The transition metal halide catalyst is denoted as $M^{+z}X_n$ and the coordinating ligand is denoted as "$L_m$" where the ligand, L, coordinated to the transition metal halide can comprise a bi- or multi-dentate ligand (m=1) or one or more monodentate ligands, depending on the particular transition metal halide. In one embodiment, the ligand comprises at least one nitrogen-donor atom, and preferably the nitrogen-donor atom is capable of interacting with the transition metal.

During the activation step, the R—X bond is activated to yield a carbon-centered radical [R*] and an oxidized metal complex [$M^{+(z+1)}X_{n+1}$]. During the propagation step, the radical may react with a vinyl monomer. During the deactivation step, the polymer is converted to have a dormant, halogen-endcapped chain.

The advantages of ATRP synthesis with respect to standard free-radical techniques arise from the fact that the equilibrium between the dormant and activated chain end species strongly favors the dormant species. Thus, the overall concentration of free-radicals is controlled and remains very low throughout the polymerization. Termination and chain transfer reactions, which contribute to uncontrolled chain branching, crosslinking and increased polydispersity in standard free-radical polymerizations, are much less probable. But because polymerization proceeds by a free-radical mechanism, ATRP can be carried out without the stringent requirements of living ionic polymerizations with regard to reagent purity.

The resulting product is a graft copolymer which comprises a comonomer covalently attached to the parent polymer. In one embodiment, the graft copolymer comprises the same backbone as the parent polymer. The graft copolymer differs from the parent polymer in that the graft copolymer has a plurality of side chains protruding from the backbone at the reactive sites. If the reactive sites were present in the parent at regular intervals, the graft copolymer can result in side chains spaced at substantially regular intervals. Such graft copolymers resemble a comb and are accordingly termed "comb polymers." In one embodiment, the comb polymers are amphiphilic, i.e. one portion of the polymer is hydrophobic while another portion is hydrophilic. Preferably, the graft copolymers have a hydrophilic (polar) side chain and a hydrophobic (nonpolar) backbone.

In one embodiment, the molecular weight of a backbone of the graft copolymer is no smaller than a molecular weight of a backbone of the parent polymer. Because previous graft co-polymers formed by uncontrolled free-radical reactions resulted in chain degradation, the products of the degradation have backbones of smaller length (i.e. lower molecular weight) than the backbone of the parent polymer. The method of the present invention is free of such degradation products and typically the molecular weight of the backbone of the graft copolymer is at least equal to that of the parent polymer.

In one embodiment, the vinyl group is provided as a portion of a hydrophilic chain, i.e. the vinyl group is covalently attached to a hydrophilic species (e.g. R' of FIG. 1). Thus, the present method provides a facile route to link a hydrophilic species directly to a polymer, and particularly for attaching hydrophilic chains to hydrophobic polymers or articles.

For example, the hydrophilic chain can comprise a poly (ethylene oxide) (PEO). PEO is well-known for its ability to resist protein adsorption, which arises from its hydrophilicity, its strong propensity to participate in hydrogen bonds, its large excluded volume, and its unique coordination with surrounding water molecules in aqueous solution. Surface-grafted PEO has been used to render ultrafiltration membranes resistant to oil and protein fouling. Preferably, the PEO has at least 5 ethylene oxide units. The method allows small PEO oligomers or higher molecular weight polymers to be added to the parent polymer backbone. Examples of hydrophilic chain comprising a vinyl group attached to a PEO is polyoxyethylene methacrylate (POEM), poly(ethylene glycol) methacrylate, poly(ethylene glycol) methyl ether methacrylate, poly(hydroxyethyl methacrylate), poly(hydroxyethylacrylate), hydrolyzed poly(t-butyl methacrylate), hydrolyzed poly(t-butyl acrylate), polyacrylamide, poly(N-vinyl pyrrolidone), poly(aminostyrene), poly(methyl sulfonyl ethyl methacrylate), and copolymers comprising combinations thereof.

Figure 2:
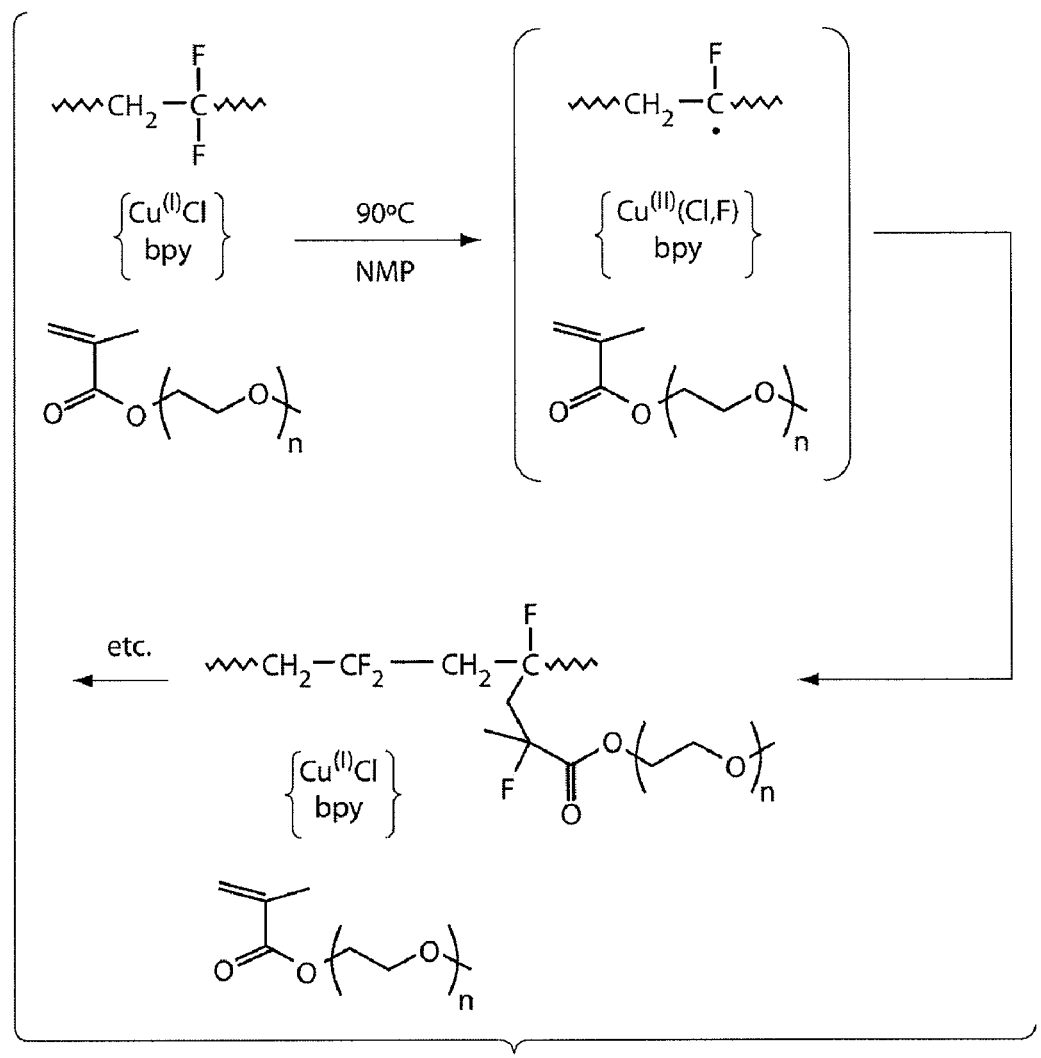
FIG. 2 shows a scheme for synthesis of PVDF-g-POEM via ATRP.

FIG. 2 shows a scheme for synthesis of PVDF-g-POEM via ATRP. The synthesis involves addition of POEM directly (i.e. no intervening linker) to a parent polymer containing secondary halogen atoms. Each repeat unit of poly(vinylidene fluoride) (PVDF) contains two fluorine atoms attached to a secondary carbon atom. Reaction of PVDF with POEM is initiated by a transition metal halide, CuCl coordinated to a bidentate nitrogen-donor ligand, bipyridine (bpy). Extraction of a fluorine atom from PVDF results in a radical centered on the secondary carbon, as the transition metal is oxidized. POEM adds at the reactive carbon site to provide POEM directly bonded to the secondary carbon atom.

In FIG. 2, the PVDF polymer grafted with POEM is referred to as poly(vinylidene fluoride)-g-polyoxyethylene methacrylate (PVDF-g-POEM) and encompasses copolymers where either one or both fluorine atoms on at least some of the secondary carbon atoms are replaced by POEM. Examples of other grafted polymers include poly(vinyl chloride)-g-polyoxyethylene methacrylate (PVC-g-POEM), and chlorinated polypropylene-g-polyoxyethylene methacrylate (cPP-g-POEM). Every repeat unit need not necessarily be reacted with a vinyl group. For many applications, however, a high density of coverage by the grafted comonomer is desired.

Many polymers are produced in high volume commercially and are used in the manufacture of numerous articles due to their mechanical, thermal and chemical stability. These polymers, however are hydrophobic which precludes their use in many applications unless a pre-treatment process is carried out. Typically, the pre-treatment involves coating the article with a species to render the article compatible for use in a particular application. Thus, it is a feature of the present invention that these polymers can be rendered hydrophilic via the grafting methods described herein. Other possible parent polymers include poly(vinyl chloride), poly(vinylidene chloride), poly(vinyl bromide), poly(vinylidene fluoride), poly(vinylidene chloride)-co-vinyl chloride ("-co-" refers to a copolymer), chlorinated poly(vinyl fluoride), chlorinated poly(vinyl chloride), chlorinated polyethylene, poly(vinyl fluoride), poly(tetrafluoroethylene), poly(1,2 difluoroethylene), poly(chlorotrifluoroethylene), and copolymers comprising combinations thereof, such as poly(vinyl chloride-co-iso butyl vinyl ether), poly(vinyl chloride-co-vinyl acetate), poly(vinylidene chloride-co-acrylonitrile), poly(vinyl chloride-co-vinyl acetate-co-maleic acid), poly(vinylidene chloride-co-methyl acrylate), and the like.

Another aspect of the present invention provides an article comprising a microphase-separated comb polymer. The comb polymer comprises a backbone repeat unit including a secondary carbon atom. A plurality of the secondary carbon atoms in the polymer are directly bonded to a hydrophilic side chain. As mentioned previously, "directly bonded" refers to a bond free of any intervening atoms or groups between the secondary carbon atom of the backbone and the hydrophilic side chain. "Microphase separated" refers to a phase separation of a first component (e.g. the backbone of the comb polymer) from a chemically dissimilar second component (e.g. side chains of the comb polymer). In the article of the present invention, hydrophilic domains are provided by the side chains, i.e. the resulting plurality of hydrophilic side chains can aggregate to form hydrophilic domains interspersed with hydrophobic domains comprising the backbone. Domain sizes are dictated by side chain dimensions and spacing along the backbone and can be determined by one of ordinary skill in the art, provided these values are known. In one embodiment, the hydrophilic domains have a mean diameter of less than about 3 nm, preferably less than about 2 nm, and more preferably less than about 1 nm.

Examples of comb polymers of the present invention include the grafted polymers include any such graft copolymers previously described herein, as derived from the parent polymers and hydrophilic chains as previously discussed.

Another aspect of the invention provides an article comprising a comb polymer having a hydrophobic backbone. A backbone repeat unit comprises a secondary carbon atom directly bonded to a halogen atom, i.e. the repeat unit includes a secondary halogen atom. The comb polymer further comprises a plurality of hydrophilic side chains in which each side chain is bonded to the secondary carbon atom. In one embodiment, at least about 5 mol % of the secondary carbon atoms in the comb polymer are bonded to a hydrophilic side chain. Depending on the composition of the blend, at least about 10 mol %, 25 mol %, 50 mol %, 75 mol %, 90 mol %, or even substantially all of the secondary carbon atoms are bonded to a hydrophilic side chain.

The comb polymer backbone has a molecular weight no smaller than the molecular weight of a corresponding parent polymer backbone. In one embodiment, this comb polymer backbone molecular weight can be achieved by any method previously described, preferably via ATRP synthesis on a parent polymer. A screening test to determine if the comb polymer making up the article is encompassed by the present invention, comprises determining an absolute molecular weight of the polymer (e.g. by light scattering techniques as known by those of ordinary skill in the art) and subjecting the polymer to NMR methods to determine the overall chemical composition and the chemical nature of the linkage between the hydrophilic side chains bonded to the secondary carbon atom, i.e. whether a direct linkage is present, as known by those of ordinary skill in the art.

This aspect encompasses any backbone, hydrophilic side chain and graft copolymers described herein. In one embodiment, the polymer is microphase-separated and can have hydrophilic domains comprising previously described compositions and dimensions.

The present invention also features the discovery that membranes for water filtration can be prepared from the graft copolymers of the invention. Water filtration membranes allow water (permeant) to penetrate through the membrane while preventing penetration of desired target (retentate) species. Solutes ranging from bacteria or other microorganisms, to proteins to salts and other ionic species can be filtered off.

Filtration membranes can be categorized into porous and nonporous membranes. In porous membranes, a transport barrier posed is based on differences between sizes of permeant and retentate species. In nonporous membranes, such as those used for reverse osmosis, species are separated by means of solubility and/or diffusivity in the membrane material. For nonporous membranes and porous membranes for nanofiltration, poor chemical affinity between the membrane material and the permeant, i.e., water, may inhibit permeability of the permeant. Hence, hydrophobic polymers having the best mechanical, thermal, and chemical properties are not useful for the fabrication of such membranes, since they are non-wettable and thus do not allow water to permeate the membrane. For this reason more hydrophilic polymers, such as cellulose acetate and polyamide, are used for the preparation of reverse osmosis and nanofiltration membranes. However, these materials exhibit comparatively poor thermal and mechanical properties, and are easily chemically degraded or hydrolyzed in aqueous environments.

In an attempt to overcome these disadvantages, thin film composite membranes have been prepared in which a hydrophilic coating is applied to the surface of a hydrophobic porous membrane, which acts as a mechanical support. Kim et al. (J. Membrane Sci. 2000, 165, pp. 189-199) prepared surface coatings comprising poly(aminostyrene) via interfacial polymerization atop a porous polysulfone membrane to obtain membranes useful for RO applications. Nunes et al. (J. Membrane Sci. 1995, 106, 49) solution-coated porous PVDF membranes with a polyether-b-polyamide copolymer (b=block) to create a nonporous surface coating capable of retaining solutes as small as 1500 g/mol. However, such thin film composite membranes have the disadvantage that the effective filtration area of the membrane separation surface is limited to the surface area comprising pores in the supporting membrane surface, typically less than 10 percent of the total area. Moreover, the application of the coating entails multiple extra processing steps beyond the preparation of the support membrane, adding substantially to the fabrication cost. Finally, the coatings of Nunes et al. were observed to degrade in acidic or alkaline solutions.

Accordingly, another aspect of the invention provides a membrane for water filtration, comprising a microphase-separated polymer including hydrophilic domains of less than about 3 nm, preferably less than about 2 nm (e.g. for reverse osmosis applications) and more preferably less than about 1 nm. A feature of the invention is that the hydrophilic domains provide transport pathways for water due to the chemical affinity for water, which facilitates water transport in preference to the retentate.

The present invention provides an advantage over thin film composite membranes in that hydrophilic domains across the membrane surface area participate in the transport of permeant, i.e., water. Ideally, the hydrophilic domains provide all the transport pathways, but in reality the membrane may have pinholes or other defects that allow water to channel through. In one embodiment, the hydrophilic domains provide the primary mode of transport for water, i.e. at least 50% of the transport pathways, preferably at least 90% of the transport pathways, more preferably at least 95% of the pathways and more preferably still at least 99% of the pathways.

The microphase-separated polymer can be a graft copolymer, and preferably a comb polymer, prepared by methods described herein. For example, the graft copolymer can be prepared by ATRP. If residual quantities of transition metal halide catalyst remain in the graft copolymer, crosslinking of the hydrophobic domains can be readily achieved through heat treatment of the finished membrane, providing additional stability.

Selectivity of water transport can be effectively controlled through the membrane pore morphology and dimensions of the hydrophilic domain. Optimal hydrophilic domain size for a given filtration application can be achieved by varying side chain length of a comb polymer and/or spacing along the graft copolymer backbone. The present invention provides the additional advantage that the entire membrane may be fabricated with a single-step, conventional immersion precipitation process. The membranes of the present invention provide the additional advantage of enhanced stability over thin film composites prepared by solution coating methods.

In one embodiment, the membrane further comprises hydrophobic domains which provide mechanical, chemical and thermal stability.

In one embodiment, the membrane is prepared entirely from the microphase-separated polymer including hydrophilic domains, i.e. it is "self-supporting" (see discussion of "self-supporting" below). In another embodiment, the "self-supporting" membrane can comprise a blend of the microphase-separated polymer and at least one other polymer. Preferably, the other polymer is a hydrophobic polymer, examples of which include poly(vinylidene fluoride) and other suitable fluoropolymers, polysulfone, poly(ether sulfone), poly(aryl sulfone), and the like, and polyolefin derivatives.

The blend can comprise any percentage of microphase-separated polymer, so long as the fabricated membrane has the graft copolymer as the majority component in the dense surface layer of the membrane. It is a feature of the invention that the graft copolymer may be a majority component in the dense surface layer of the membrane even when it is a minority component in the porous membrane sublayer, due to the capability of the amphiphilic copolymer to localize preferentially at the surface during membrane fabrication by immersion precipitation.

In one embodiment, the microphase-separated polymer is present in an amount of at least 5% by weight of the blend. It is a feature of the invention that the microphase-separated polymer can be present in small amounts to render the desired surface properties due to the capability of the blend to surface segregate. Surface segregation of one component results from certain thermodynamic driving forces, i.e. if reduction of interfacial free energy between the two components more than compensates for the loss of combinatorial entropy upon de-mixing and, in the case of exothermic mixing, the loss of mixing enthalpy. Thus, even if a small amount of the microphase-separated polymer is present, a significant portion of the polymer can occupy the area near the surface of the membrane. In another embodiment, the microphase-separated polymer is present in an amount from 5% to 10% by weight of the blend. This small percentage of polymer can have a near surface concentration of at least about 20% by weight, more preferably at least about 30%, and even more preferably at least about 40% by weight.

Presently, many commercially available water filtration membranes comprise an asymmetric structure with a relatively dense, 0.1 to 1 μm surface layer overlaying a highly porous sublayer. The separation characteristics of the membrane are determined by a pore size distribution in the surface layer, while the porous sublayer provides mechanical support. Separation is achieved at the membrane surface while relatively high fluxes are allowed through the large pore channels which comprise the bulk of the membrane volume. A hydrophilic surface can be provided on this structure by coating this surface layer with a hydrophilic groups. This coating, however, may cause clogging of the pores. In addition, flux rates may decrease as water has to penetrate through several layers.

Thus, another aspect of the present invention provides a membrane for water filtration comprising a microphase-separated polymer. The polymer includes hydrophilic domains. An advantageous feature of the invention is that the membrane is "self-supporting", i.e. the membrane does not require an additional mechanical support, as discussed in Kim et al. (see above).

The microphase-separated polymer preferably resists the adsorption of proteins and has sufficient wettability properties, as described previously. Moreover, the polymer has sufficient characteristics to convey the desired mechanical properties. In one embodiment, the membrane can comprise a blend of the microphase-separated polymer and at least one other polymer. Preferably, the other polymer is a hydrophobic polymer and can include any of the hydrophobic polymers described previously.

In certain embodiments, any article described herein is resistant to fouling. Fouling can result by the deposition of proteins, cells or other larger biological species such as microorganisms. By the provision of hydrophilic surface chemistry, the susceptibility to fouling is decreased significantly. In one embodiment, the article is resistant to cell and protein adsorption such that the article adsorbs less than 90% of protein adsorbed by a corresponding parent polymer, and preferably less than 50%, 20%, 10% or 5% of the protein adsorbed by the corresponding parent polymer. Typically, the corresponding parent polymer is hydrophobic and allows deposition of proteins and cells. The extent an article is resistant to cell and protein adsorption can be determined by XPS. For example, immersing a membrane in a solution containing bovine serum albumin (BSA) will allow detection of nitrogen due to BSA adsorption (see Example 4). The adsorption of biological species such as cells can be determined by microscopy.

While these embodiments encompass articles comprising any graft copolymer previously, the invention can also comprise blends including the graft copolymer blended with at least one other polymer. One example includes the graft copolymer poly(vinyl chloride)-g-POEM blended with PVC. This blend can result in enhanced protein and cell resistance at the surface of the article.

In one embodiment the present invention provides articles comprising poly(vinyl chloride) (PVC) resistant to the adsorption of proteins. PVC is a polymer of great commercial importance for the fabrication of medical devices, including IV and blood bags, infusion tubes, circulation tubes, endotracheal tubes, stomach feeding tubes, wound drainage tubes, catheters, and surgical dressings. Due to its hydrophobic nature, however, PVC is susceptible to the adsorption of proteins from aqueous solution. In blood contacting applications, protein adsorption results in the activation and aggregation of platelets followed by thrombosis, as well as activation of the complement system leading to systemic immune response, which can result in organ dysfunction. In other applications, such as PVC endotracheal tubes, protein deposition can lead to an increased risk of bacterial infection.

In certain other embodiments, any comb polymer described herein comprise a covalently bound plasticizer. In one embodiment, the comb polymer comprises a plurality of side chains, such as any side chain described herein, which comprise a plasticizer such that a glass transition temperature of the comb polymer is at least 5° C. less than that of the corresponding parent polymer. In other embodiments, the glass transition temperature is at least about 10° C., 20° C., 50° C. or 100° C. less than that of the corresponding parent polymer. For example, PVC has insufficient mechanical properties for many applications unless plasticizers are added. Plasticizers also improve processability. Because plasticizers usually comprise small molecule organic compounds, a problem with flexible PVC medical devices, which may be composed of up to 45% additives including plasticizers, is the extraction of small molecule plasticizers by blood, digestive fluids, and other media which contact them. Aside from potential toxic effects, plasticizer leaching from PVC devices with long contact times, such as stomach feeding and wound drainage tubes, can cause device hardening and consequent trauma to the patient.

Another aspect of the present invention provides an article comprising a comb polymer comprising a poly(vinyl chloride) backbone and hydrophilic side chains. The hydrophilic side chains can comprise groups exhibiting protein and cell resistant properties. In a preferred embodiment, the hydrophilic side chains comprise poly(ethylene oxide), in which a specific example of such a side chain is polyoxyethylene methacrylate. Other examples of hydrophilic side chains include poly(hydroxyethyl methacrylate), poly(hydroxyethylacrylate), polyacrylamide, poly(N-vinyl pyrrolidone), poly(vinyl alcohol), and the like, and copolymers comprising any of the above, and the like. The hydrophilic side chains convey enhanced anti-thrombogenicity, as well as a plasticizing effect. The graft copolymer can easily be processed into the article of manufacture. Due to the covalent bonding of the hydrophilic side chains to the PVC backbone, they cannot be easily leached into the biological fluid.

While the invention encompasses articles substantially made up of the graft copolymer of the invention, the invention can also comprise blends including the graft copolymer blended with at least one other polymer. One example includes the graft copolymer poly(vinyl chloride)-g-POEM blended with PVC. This blend can result in enhanced protein and cell resistance at the surface of the article.

In certain other embodiments, any article described herein is capable of being spontaneously wettable. Wettability is a critical feature for a water filtration membrane. If the membrane is incapable of being wetted, water cannot pass through the membrane. Wettability of a surface can be quantified by adding water droplets to the surface and measuring a contact angle between a droplet of water and the surface. A hydrophobic surface, such as pure PVDF, is incapable of wetting, and a droplet of water placed on a pure PVDF membrane assumes a high contact angle, which changes very little over time until the drop finally evaporates. A wettable surface provides low contact angles, preferably having a value of less than about The capability for "spontaneous" wetting can be determined by measuring the time required for the contact angle of the droplet to reach 0°. A membrane of the present invention is preferably wetted within a time of no more than about 5 min., preferably no more than about 3 min and preferably no more than about 1 min.

Another aspect of the present invention provides articles comprising graft copolymers, comprising a halogenated, hydrophobic backbone and hydrophilic side chains, having nonspecific protein-adsorption and cell resistant properties, and specific cell-signaling capability through attached biological ligands. Such ligands include adhesion peptides, cell-signaling peptides, and growth factors. In one embodiment, the attached biological ligands are attached through the hydrophilic side chains or side chain ends, directly or indirectly, by covalent bonds. An example of such an article comprises a graft copolymer having a halogenated, hydrophobic backbone and hydrophilic side chains containing reactive —OH groups which serve as sites for attachment of biological ligands. Examples of hydrophilic side chains with reactive —OH groups include poly(ethylene glycol methacrylate), poly(hydroxyethyl methacrylate), and poly(vinyl alcohol). Examples of biological ligands of the present invention include RGD and other adhesion peptides, EGF, TGF and other growth factors, heparin, and the like. Hydrophobic backbones of the present invention include poly(vinylidene fluoride), chlorinated polyethylene, poly(vinyl fluoride), poly(tetrafluoroethylene), poly(1,2-difluoroethylene), poly(chlorotrifluoroethylene), halogenated polypropylene, halogenated polyethylene, halogenated polysulfone, halogenated poly(ether sulfone), halogenated poly(aryl sulfone), and the like, and copolymers comprising any of the above.

The function and advantage of these and other embodiments of the present invention will be more fully understood from the examples below. The following examples are intended to illustrate the benefits of the present invention, but do not exemplify the full scope of the invention.

EXAMPLE 1

Synthesis of Graft Copolymers by ATRP with Initiation Via Secondary Halogen Atoms Materials. Poly(vinylidene fluoride) (PVDF) ($\overline{M}_n$ ca. 107 000 g/mol, $\overline{M}_w$ ca. 250 000 g/mol), poly(vinyl chloride) (PVC) (inherent viscosity 0.51), chlorinated polyethylene (cPE) (40 wt % Cl), POEM ($\overline{M}_n$=475 g/mol), tert-butyl methacrylate (tBMA), copper(I) chloride (CuCl), 4,4'-dimethyl-2, 2'-dipyridyl (bpy), 1,1,4,7,10,10-hexamethyltriethylenetetramine (HMTA), p-toluenesulfonic acid (TSA), 1-methyl-2-pyrrolidinone (NMP), and N,N-dimethylformamide (DMF) were purchased from Aldrich Chemical Co. (Milwaukee, Wis.). Deuterated solvents were purchased from VWR. All reagents were used as received.

PVC-g-POEM. Synthesis Protocol. In a typical reaction, PVC (5 g) was weighed into a conical flask containing a Teflon stir bar and dissolved in DMF (40 ml). POEM (20 ml), CuCl (0.06 g), and HMTA (0.42 g) were then added to the reaction mixture, after which the conical flask was sealed with a rubber septum. Argon gas was bubbled through the reaction mixture for 15 min. while stirring. The reaction vessel was then placed immediately into an oil bath preheated to 90° C., and the reaction was allowed to proceed for 24 h. The graft copolymer was precipitated into a mixture containing 1 part methanol, 1-2 parts petroleum ether, and a small amount of HCl and recovered by filtration. The polymer was purified by redissolving in NMP and reprecipitating 3 times in similar methanol/petroleum ether mixtures. Finally, the polymer was dried under vacuum overnight at room temperature.

Figure 3:
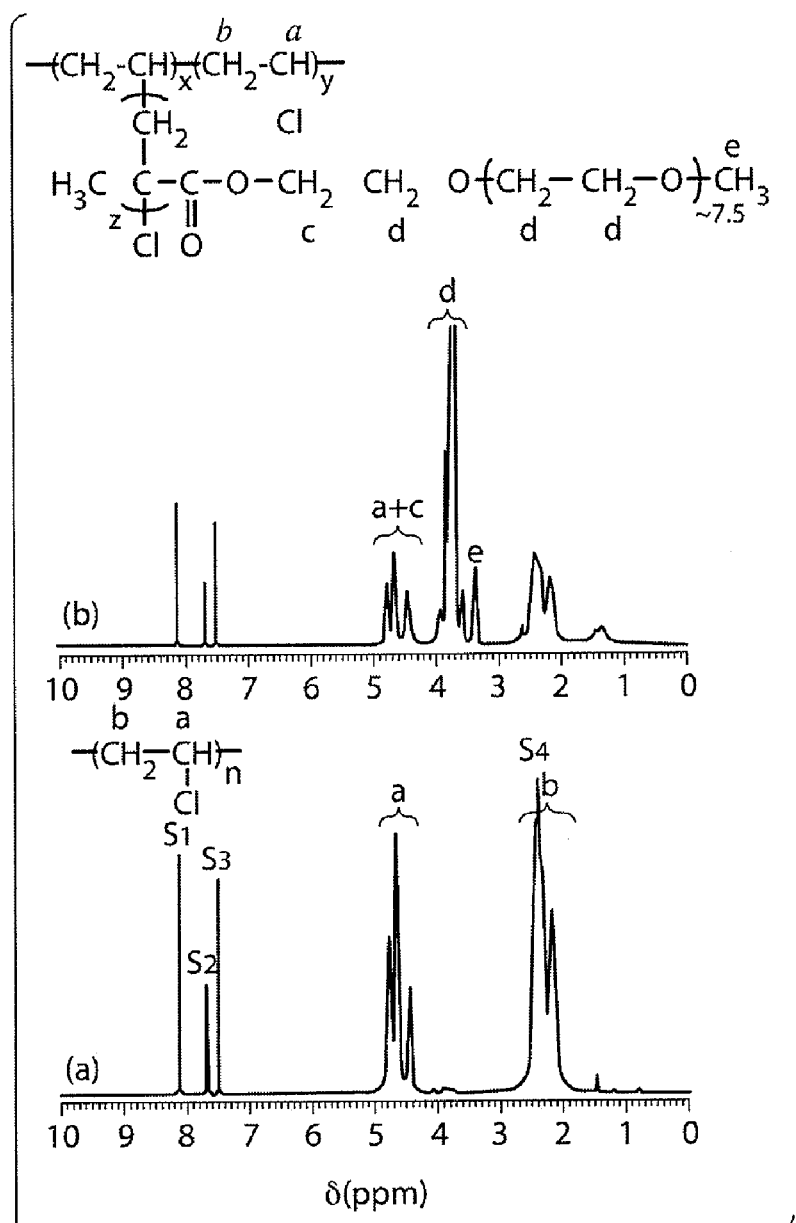
FIG. 3 shows $^1$H NMR spectra for (a) PVC and (b) PVC-g-POEM$^b$ and chemical structure, in which resonances labeled $s_n$ are solvent peaks due to deuterated nitrobenzene.

Characterization. Composition. PVC and its graft copolymers were characterized by $^1$H nuclear magnetic resonance (NMR) spectroscopy in deuterated nitrobenzene using a Bruker DPX 400 spectrometer. The $^1$H NMR spectra for PVC and PVC-g-POEM$^b$ appear in FIG. 3. In the PVC-g-POEM spectrum, the POEM resonance c at ~4.3 ppm is convolved with PVC resonance a. The mole fraction of grafted POEM was therefore estimated as, $$X_{POEM(PVC)} = \frac{\frac{1}{37}\left(I_d + I_e + \frac{2}{3}I_e\right)}{\frac{1}{37}\left(I_d + I_e + \frac{2}{3}I_e\right) + I_{(a+c)} - \frac{2}{3}I_e} \quad (1)$$

where $I_x$ is the intensity of resonance x and the relationship, $$I_c = \frac{2}{3}I_e \quad (2)$$

was assumed from stoichiometry. The compositions of the graft copolymers appear in Table 1.

TABLE 1

Properties of Parent Polymers and Graft Copolymers

| Polymer | Graft Copolymer Composition | $\overline{M}_n$ (g/mol) | Contact Angle (°) $\theta_{adv}$ | Contact Angle (°) $\theta_{rec}$ |
|---|---|---|---|---|
| PVC | — | 71 700† | 90.2 | 82.3 |
| PVC-g-POEM$^a$ | 19 wt % POEM | 88 000‡ | 73.0 | 42.9 |
| PVC-g-POEM$^b$ | 50 wt % POEM | 143 200‡ | 42.6 | 32.4 |
| PVDF | — | 107 000†† | 87.5 | 75.9 |
| PVDF-g-POEM$^a$ | 44 wt % POEM | 189 400‡ | 65.0 | 28.5 |
| PVDF-g-POEM$^b$ | 67 wt % POEM | 323 200‡ | 38.8 | <5 |
| PVDF-g-PMAA | 49 wt % PMAA | 211 300‡ | — | — |
| cPE | — | — | 96.9 | 84.2 |
| cPE-g-POEM | 49 wt % POEM | — | 26.3 | 16.5 |
| cPP | — | 254 200† | 96.2 | 93.7 |
| cPP-g-POEM | 48 wt % POEM | 490 300‡ | 84.8 | 41.0 |
| PSf | — | 26 000†† | 81.4 | 74.5 |
| PSf-g-POEM | 50 wt % POEM | 30 600‡ | 72.1*, 52.4** | 53.2*, 38.5** |

†From GPC, based on polystyrene standards
††From the manufacturer
‡Estimated based on composition from $^1$H NMR using Equation (3)
*Contact angle measurements performed on PSf/10 wt % PSf-g-POEM blend
**Contact angle measurements performed on PSf/20 wt % PSf-g-POEM blend Molecular Weight. Gel permeation chromatography (GPC) was performed on the parent PVC and its PVC-g-POEM products in tetrahydrofuran (THF) at 30° C., using polystyrene standards for calibration. GPC of PVC indicated that it had a polystyrene standard molecular weight of $\overline{M}_n$=71 700 g/mol and $\overline{M}_w$=131 500 g/mol. The GPC traces of PVC-g-POEM$^a$ and PVC-g-POEM$^b$ exhibited monomodal distributions shifted up in molecular weight to $\overline{M}_n$=80 900 g/mol, $\overline{M}_w$=177 000 g/mol, and to $\overline{M}_n$=105 100 g/mol, $\overline{M}_w$=170 400 g/mol, respectively. The monomodal nature of the peaks rules out any significant homopolymer contaminant. However, the molecular weights obtained by GPC for the graft copolymer products are not good estimates of their true molecular weights, due to the difference in hydrodynamic volumes between linear and branched polymers of equal molecular weight. Thus, the number-average molecular weights of all graft copolymers were estimated from their compositions as obtained from $^1$H NMR, using the formula, $$\overline{M}_{n,graft} = \overline{M}_{n,base}\left(1 + x\frac{M_o^{POEM}}{M_o^{base}}\right) \quad (3)$$

where $\overline{M}_{n,base}$ is the number-average molecular weight of the base polymer, x is the molar ratio of POEM units to base polymer repeat units in the copolymer as measured by $^1$H NMR, and $M_o^{POEM}$ and $M_o^{base}$ are the molecular weights of POEM and the base polymer repeat unit, respectively. The molecular weights of the graft copolymers so calculated appear in Table 1.

Aliquots of the copolymers taken after the last two precipitations were indistinguishable by both GPC and NMR.

PVDF-g-POEM. Synthesis Protocol. In a typical reaction, PVDF (5 g), POEM (50 ml), CuCl (0.04 g), and bpy (0.23 g) were co-dissolved in NMP in a conical flask, as above. The reaction vessel was similarly purged with argon gas, after which the reaction was performed at 90° C. for 19 h. The polymer was recovered and purified by successive precipitations in methanol/petroleum ether mixtures, as above, and dried under vacuum overnight at room temperature.

Figure 4:
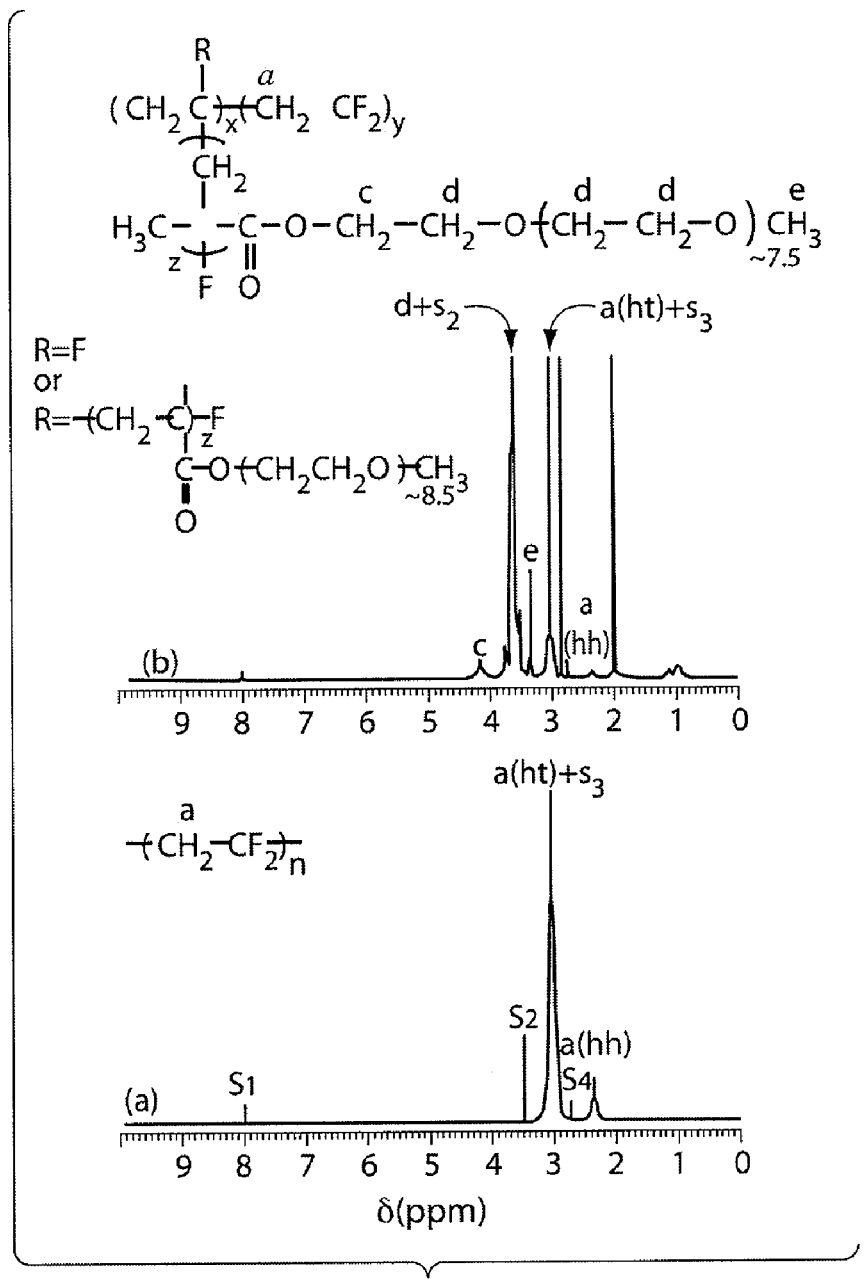
FIG. 4 shows $^1$H NMR spectra for (a) PVDF$_{250K}$, and (b) PVDF-g-POEM$_9$ in which resonances labeled $s_n$ are solvent peaks due to deuterated DMF, resonances labeled ht and hh are due to head-to-tail and head-to-head PVDF repeat units, respectively; one or both of the fluorine atoms on each PVDF repeat unit may act as an initiation point for monomer addition (b, inset chemical structure)

Characterization. Composition. PVDF and its POEM-grafted copolymers were characterized by $^1$H NMR in deuterated DMF. The $^1$H NMR spectra for PVDF and PVDF-g-POEM$^b$ appear in FIG. 4. The PVDF spectrum exhibits two well-known peaks due to head-to-tail (ht) and head-to-head (hh) bonding arrangements. Grafting of POEM to PVDF resulted in the appearance of peaks in the region 3.2-4.3 ppm due to the O—CH$_x$ bonding environments in the PEO side chains. The solvent peaks s$_2$ and s$_3$ were subtracted from the spectra using their known intensities relative to solvent peak s$_1$ obtained by analysis of pure deuterated DMF. The mole fraction of POEM in the PVDF copolymer was then calculated as, $$X_{POEM(PVDF)} = \frac{\frac{1}{37}(I_c + I_d + I_e)}{\frac{1}{37}(I_c + I_d + I_e) + \frac{1}{2}(I_{a(ht)} + I_{a(hh)})} \quad (4)$$

where I$_x$ denotes the intensity of resonance x. The compositions of PVDF and its graft copolymers appear in Table 1.

Figure 5:
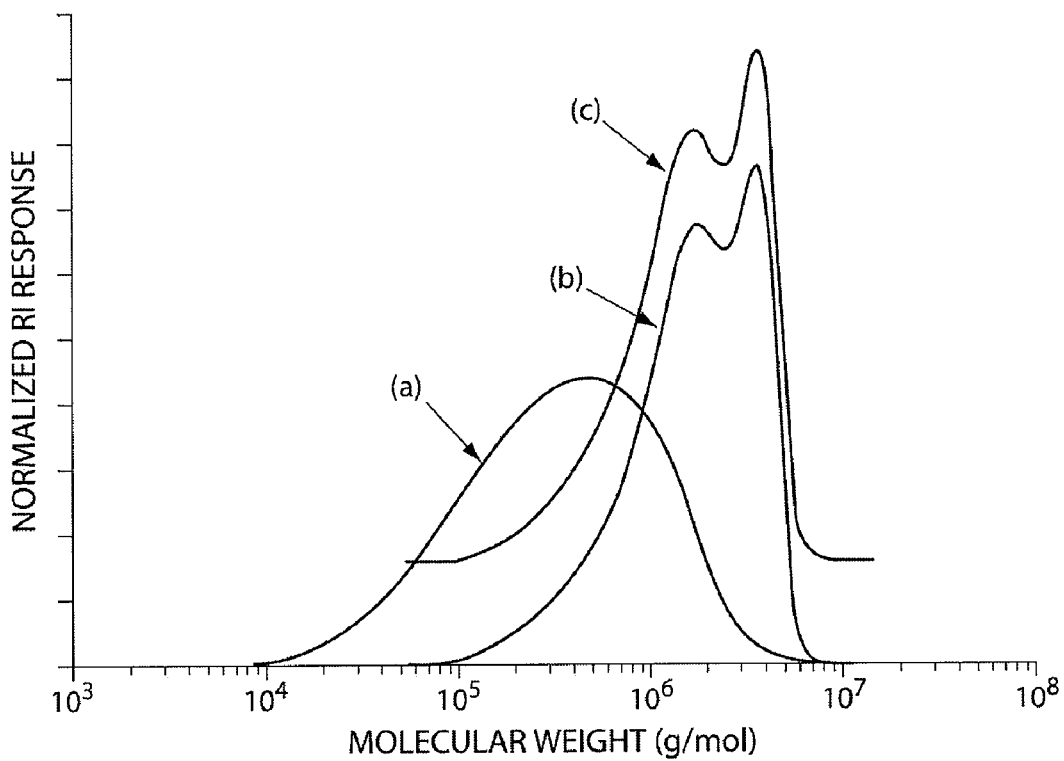
FIG. 5 shows GPC traces of (a) PVDF$_{250K}$, the parent polymer for (b) PVDF-g-POEM$^b$; trace (c), offset for clarity, is PVDF-G-POEM$^b$ following a subsequent 48-h extraction in a large volume of water; the molecular weight scale was calibrated using PMMA standards.

Molecular Weight. PVDF and PVDF-g-POEM$^b$ were characterized by GPC in DMF containing 1% lithium nitrate at 30° C., with the molecular weight scale calibrated using PMMA standards. GPC traces for the two polymers appear in FIG. 5. The grafting reaction resulted in a significant molecular weight increase, from a PMMA standard molecular weight of $\overline{M}_w$=1 218 300 for PVDF$_{250K}$ to $\overline{M}_w$=2 979 900 for PVDF-g-POEM$^b$. The molecular weight distribution of the graft copolymer is bimodal. The GPC trace is virtually unchanged after a 48-h extraction in a large volume of dW, a good solvent for poly(POEM), indicating that its bimodality is not due to homopolymerization of POEM (FIG. 5c). Rather, the bimodal distribution is likely a result of radical-radical coupling of chains during polymerization, which has been observed previously in ATRP graft copolymerizations, and which can result in multi-modal molecular weight distributions. While such termination reactions are generally undesirable, it will be shown in Example 3 that they do not compromise the ability of PVDF-g-POEM to surface segregate during the fabrication of PVDF membranes, providing a highly desirable surface chemistry.

Due to the differences in chain flexibility between the PVDF-based graft copolymers and linear PMMA standards and differences between the hydrodynamic radii of linear and branched polymers of equal molecular weight, the PMMA standard molecular weights are not accurate numerical estimates of the true graft copolymer molecular weights. More accurate estimates of the number-average molecular weights of PVDF-g-POEM were obtained from the NMR data using Equation 3. The molecular weights so calculated appear in Table 1.

Figure 6:
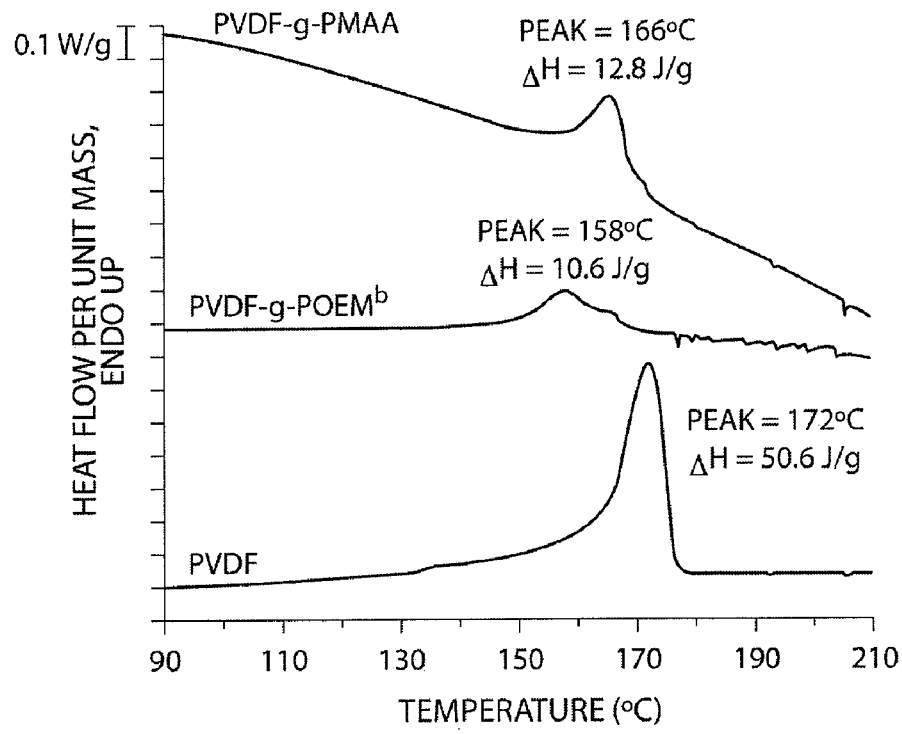
FIG. 6 shows differential scanning calorimetry (DSC) traces for PVDF, PVDF-g-POEM$^b$, and PVDF-g-PMAA.

Thermal Analysis. Differential scanning calorimetry (DSC) analysis was performed using a Perkin Elmer Pyris 1 calorimeter. All samples were preconditioned by holding at 210° C. for 15 min., cooling to 130° C. at 10° C./min., holding at that temperature for 15 min., and cooling to 50° C. at 10° C./min. DSC curves were then obtained by scanning from 50° C. to 230° C. at a heating rate of 10° C./min. DSC curves for PVDF and PVDF-g-POEM$^b$ are shown in FIG. 6. PVDF-g-POEM$^b$ is semicrystalline, with a depressed melting point compared to pure PVDF.

Figure 7:
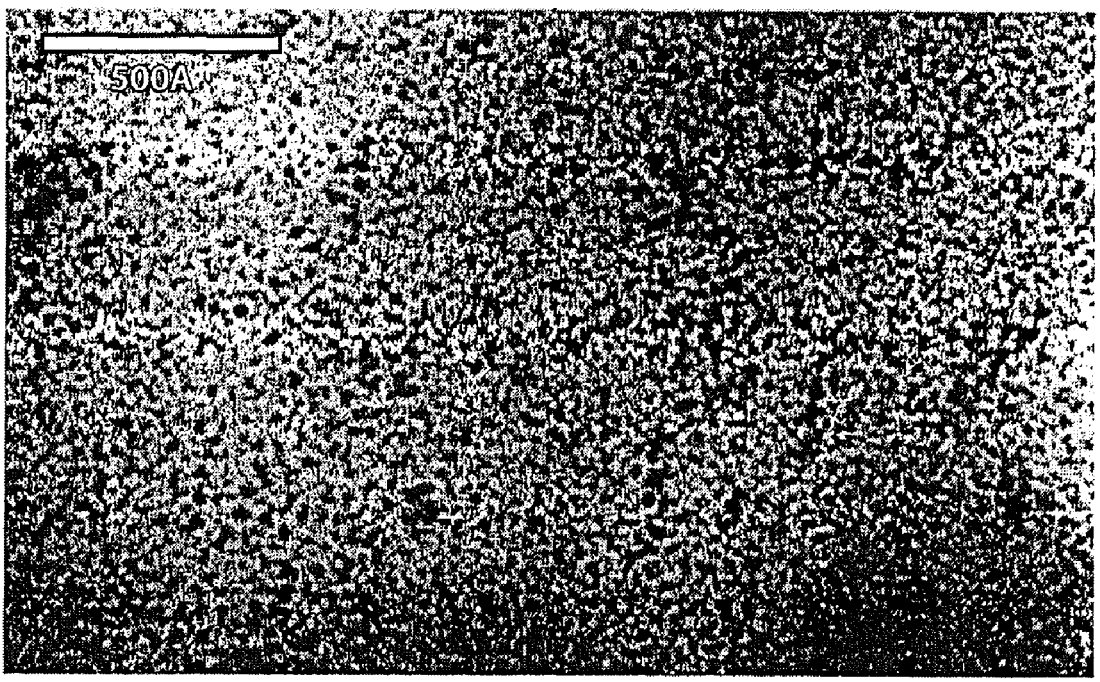
FIG. 7 shows a TEM image of PVDF-g-POEM stained with ruthenium tetroxide.

Morphology. The morphology of PVDF-g-POEM$^b$ was characterized by transmission electron microscopy (TEM). A bulk polymer sample was equilibrated in a vacuum oven at 200° C. for 12 h. It was then cryomicrotomed into 50-nm thick sections at −55° C. using a RMC (Tucson, Ariz.) MT-XL ultramicrotome. The sections were mounted on copper grids and stained with ruthenium tetroxide for 20 min. at room temperature. It is well known that ruthenium tetroxide selectively stains the ether moieties in PEO. TEM images of the sections were obtained using a JEOL 200CX microscope. FIG. 7 is one such image, in which the stained PEO appears black. Black domains approximately 10-20 Å in size appeared throughout the sample. This is roughly the expected size of a single 9 EO unit POEM side chain. These results suggest that PVDF-g-POEM microphase separates, with individual POEM side chains forming hydrophilic domains in a matrix of hydrophobic PVDF.

PVDF-g-PMAA. Synthesis Protocol. PVDF (5 g) was dissolved in NMP (40 mL) at 50° C. The mixture was cooled to room temperature, after which tBMA (50 mL), CuCl (0.041 g), and bpy (0.23 g) were added and the reaction vessel was sealed with a rubber septum. Argon gas was bubbled through the reaction mixture for 15 min. while stirring. The reactor was then placed immediately into an oil bath preheated to 90° C., and the reaction was allowed to proceed for 20 h. The graft copolymer was precipitated into a 1:1 water/ethanol mixture. It was then purified by redissolving it in NMP and reprecipitating it in a similar water/ethanol mixture. The graft copolymer, PVDF-g-PtBMA, was recovered by filtration and dried in a vacuum oven overnight. PVDF-g-PtBMA (5.52 g) was cut into chunks ~2 mm in size, which were immersed in anhydrous toluene (300 mL). The polymer swelled significantly in the solvent, although it did not dissolve. TSA (31 g) was added to the reactor, after which the reactor was immediately sealed with a rubber septum and the TSA dissolved by vigorous stirring. Argon gas was then bubbled through the reaction mixture for 15 min., after which the reactor was placed in an oil bath preheated to 85° C. After 7 h, the reaction mixture was poured into excess methanol (a good solvent for TSA). Much of the polymer remained in the form of "chunks," although some of it was finely dispersed. The polymer was recovered by filtration, redissolved in DMF, precipitated in a mixture containing 4 parts hexane and 1 part ethanol, and again recovered by filtration. For further purification, the polymer was stirred overnight in a large volume of THF (in which it swelled but did not dissolve), and precipitated again in a hexane/ethanol mixture. The graft copolymer, PVDF-g-PMAA, was finally dried in a vacuum oven overnight at room temperature.

Figure 8:
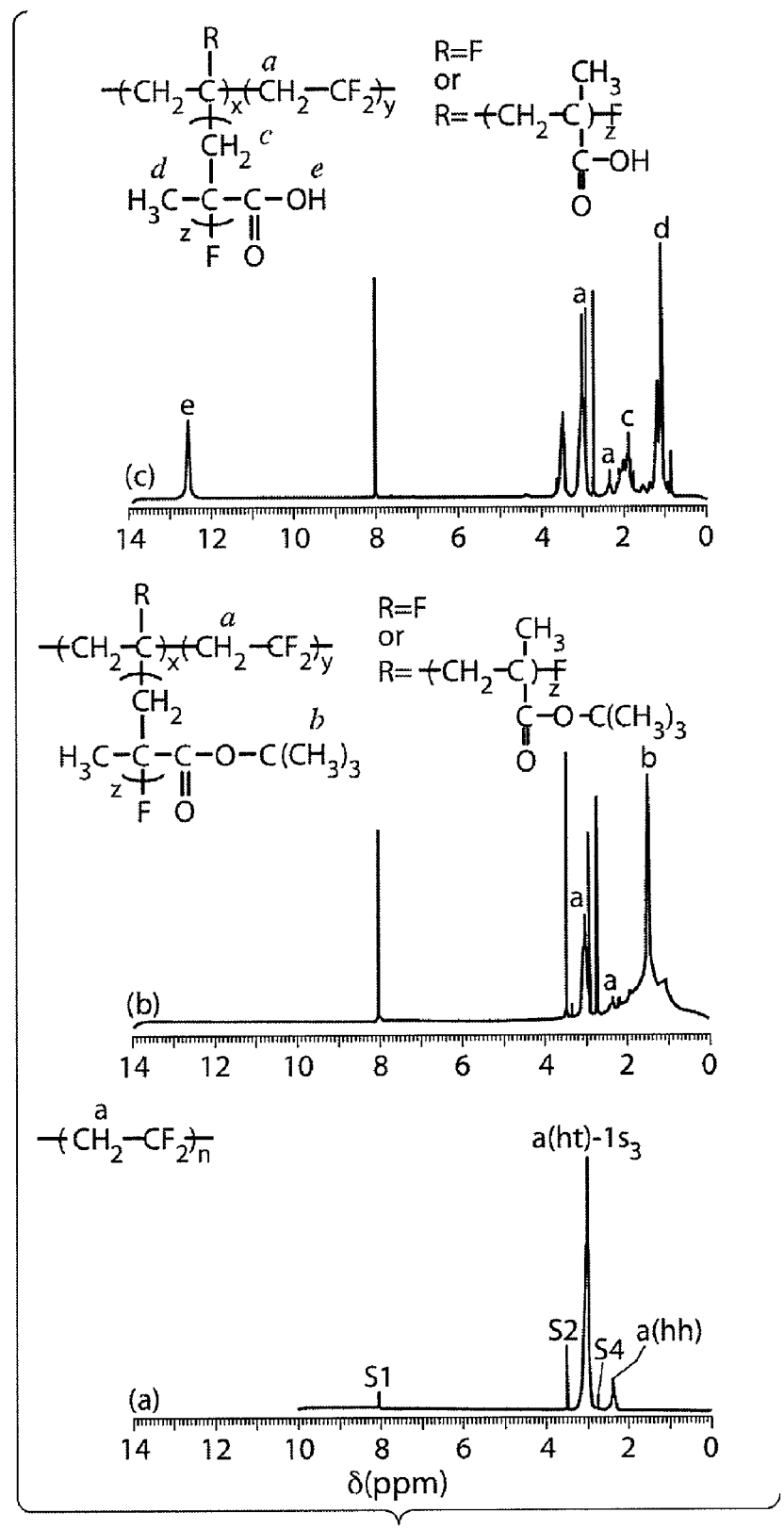
FIG. 8 shows $^1$H NMR spectra for (a) PVDF$_{250K}$, (b) PVDF-g-PtBMA, and (c) PVDF-g-PMAA in which resonances $s_n$ are solvent peaks due to deuterated DMF; quantitative hydrolysis of PtBMA to PMAA is confirmed by the disappearance in (c) of the t-butyl peak b and the appearance of the acid proton peak e.

Characterization. Composition. PVDF, PVDF-g-PtBMA, and PVDF-g-PMAA were characterized by $^1$H NMR in deuterated DMF. NMR spectra for the polymers appear in FIG. 8. Grafting of tBMA to PVDF resulted in the appearance of a peak at 1.5 ppm due to the tert-butyl protons. Despite the heterogeneous nature of the hydrolysis reaction, hydrolysis of the PtBMA side chains to PMAA was quantitative, as indicated by the complete disappearance of the tert-butyl peak. The spectrum for PVDF-g-PMAA also contained a resonance at 12.6 ppm due to the carboxylic acid proton. The compositions of both PVDF-g-PtBMA and PVDF-g-PMAA were calculated from their NMR spectra. In both cases, the solvent resonance s$_3$ was subtracted using its known intensity relative to solvent peak s$_1$ established by NMR analysis of pure deuterated DMF. The mole fraction of tBMA in PVDF-g-PtBMA was calculated from FIG. 8b as, $$X_{tBMA} = \frac{\frac{I_b}{9}}{\frac{I_b}{9} + \frac{1}{2}(I_{a(ht)} + I_{a(hh)})} \quad (5)$$

where $I_x$ denotes the intensity of resonance x in FIG. 8. The mole fraction of MAA in PVDF-g-PMAA was similarly calculated from FIG. 8c as, $$X_{MAA} = \frac{I_e}{I_e + \frac{1}{2}(I_{a(ht)} + I_{a(hh)})} \quad (6)$$

The calculated values were $X_{tBMA}$=0.403 and $X_{MAA}$=0.438, respectively. The close agreement between the two values provides strong evidence that the hydrolysis reaction was selective and quantitative, and that most of the methacrylic acid units of the hydrolyzed copolymer were protonated. The PVDF-g-PMAA composition reported in Table 1 was computed from an average of the two mole fractions above.

Figure 9:
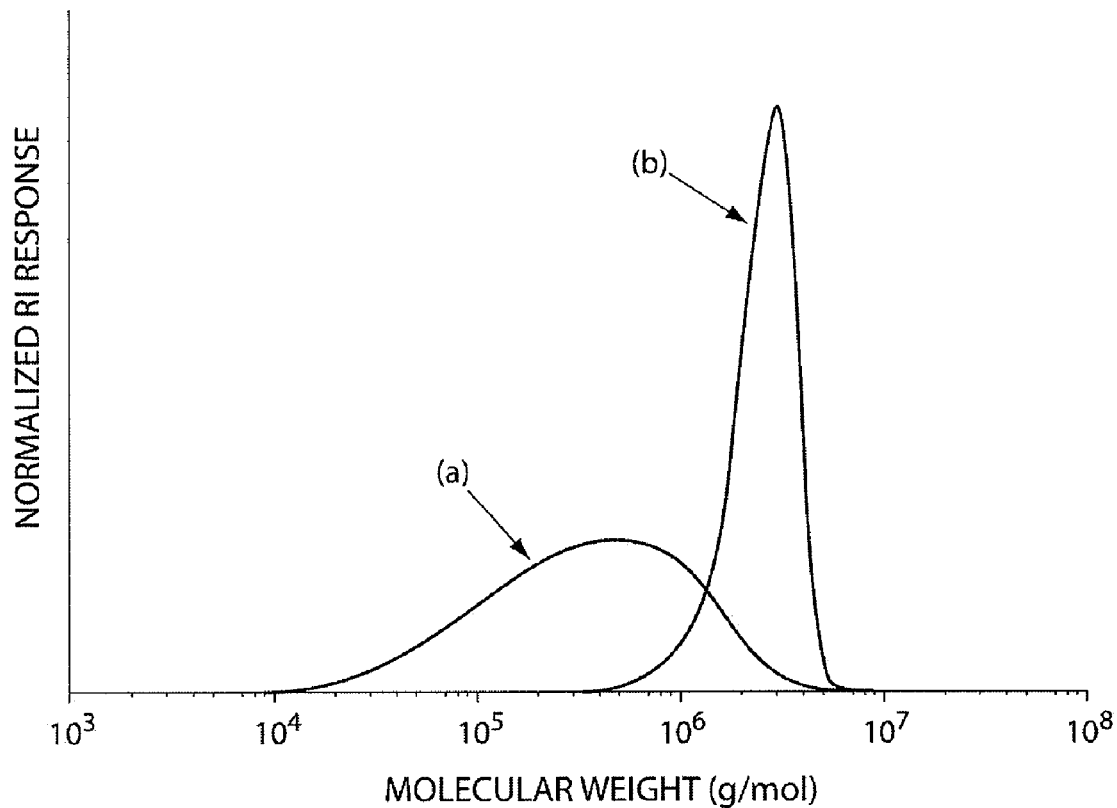
FIG. 9 shows gel permeation chromatography (GPC) traces of (a) PVDF$_{250K}$, parent polymer of (b) PVDF-g-PMAA; the molecular weight scale was calibrated using PMMA standards.

Molecular Weight. GPC of PVDF-g-PMAA was conducted in DMF containing 1% lithium nitrate at 30° C., using PMMA standards. GPC traces of PVDF and PVDF-g-PMAA appear in FIG. 9, where it can be seen that the grafting reaction results in a significant molecular weight increase. Unlike PVDF-g-POEM, the molecular weight distribution of PVDF-g-PMAA is monomodal, providing evidence of neither homopolymerization nor radical-radical coupling reactions. As with PVDF-g-POEM, above, a more accurate estimate of the number-average molecular weight of PVDF-g-PMAA was obtained from the NMR data using an equation analogous to Equation 3. The molecular weight so calculated is reported in Table 1.

Thermal Analysis. DSC measurements were performed on PVDF-g-PMAA as described above for PVDF-g-POEM[b]. DSC curves for pure PVDF and PVDF-g-PMAA appear in FIG. 6. PVDF-g-PMAA is semicrystalline, with a melting point slightly depressed compared to pure PVDF.

cPE-g-POEM. Synthesis Protocol. cPE (5 g), POEM (50 ml), CuCl (0.04 g), and HMTA (0.23 g) were dissolved in NMP in a conical flask, as above. The reaction vessel was similarly purged with argon gas, after which the reaction was performed at 90° C. for 24 h. The polymer was recovered and purified by successive precipitations in methanol/petroleum ether mixtures.

Characterization. cPE and its graft copolymer were characterized by $^1$H NMR in deuterated DMF. The $^1$H NMR spectrum for cPE exhibited multiplets in the region 0.8-2.3 ppm (C—CH$_x$). Grafting of POEM onto cPE resulted in the appearance of well-defined peaks in the region 3.2-4.3 ppm (O—CH$_x$) entirely analogous to those observed for the POEM-grafted copolymers of PVC and PVDF. After subtraction of the solvent peaks according to the established by NMR spectrum of pure deuterated DMF, the mole fraction of POEM in cPE-g-POEM was roughly estimated from the ratio of the total intensities of the O—CH$_x$ and C—CH$_x$ resonances. The estimated composition so obtained appears in Table 1.

EXAMPLE 2

Thin Film Coatings

Materials. Chlorinated polypropylene (cPP) (isotactic, 26 wt % Cl), polysulfone (PSf) ($\overline{M}_n$ ca. 26 000 g/mol), zinc oxide (ZnO), and chloromethyl ether were purchased from Aldrich Chemical Co. (Milwaukee, Wis.). Chloroform and deuterated solvents were purchased from VWR. (Tridecafluoro-1,1,2,2-tetrahydrooctyl)-1-dimethylchlorosilane was obtained from Gelest, Inc. (Bristol, Pa.). Cell culture reagents were purchased from Gibco. All reagents were used as received.

Synthesis of Additional Graft Copolymers. cPP-g-POEM. Synthesis Protocol. cPP (5 g), POEM (50 ml), CuCl (0.04 g), and HMTA (0.23 g) were dissolved in NMP in a conical flask, as above. The reaction vessel was similarly purged with argon gas, after which the reaction was performed at 90° C. for 48 h. The polymer was recovered and purified by successive precipitations in methanol/petroleum ether mixtures.

Characterization. cPP and its graft copolymer were characterized by $^1$H NMR in deuterated benzene. The $^1$H NMR spectrum for cPP exhibited multiplets in the region 0.8-2.3 ppm (C—CH$_x$) and in the region 3.3-4.5 (C—CH$_x$Cl). Grafting of POEM onto cPP resulted in the appearance of well-defined peaks in the region 3.2-4.3 ppm (O—CH$_x$) entirely analogous to those observed for the POEM-grafted copolymers of PVC and PVDF. For cPP-g-POEM, the mole fraction of POEM was roughly estimated from the ratio of the total intensities of the O—CH$_x$ and C—CH$_x$ resonances. The estimated composition so obtained appears in Table 1.

PSf-g-POEM. Synthesis Protocol. As-received PSf containing oxyphenylene repeat units was first modified to incorporate pendant chloromethyl groups via electrophilic substitution. A solution of ZnO (1.2 g) in chloromethymethyl ether (12 g) was added drop-by-drop to a solution of PSf (6 g) in chloroform (40 mL). After refluxing for 3-5 hours at 40° C., the polymer was recovered and purified by successive precipitation in methanol and water. The resulting polymer PSf-CH$_2$Cl (5 g), POEM (50 ml), CuCl (0.04 g), and HMTA (0.23 g) were then dissolved in NMP in a conical flask, as above. The reaction vessel was similarly purged with argon gas, after which the reaction was performed at 90° C. for 19 h. The polymer was recovered and purified by successive precipitations in methanol/petroleum ether mixtures.

Characterization. PSf, PSf-CH$_2$Cl, and PSf-g-POEM were characterized by $^1$H NMR in deuterated chloroform. The $^1$H NMR spectrum for PSf exhibited multiplets in the region 0.8-3.2 ppm (C—CH$_x$) and in the region 6.8-8.0 (aromatic C—H). Adding chlorine to PSf gives rise to the peak around 4.5 (C—CH$_x$Cl) in the $^1$H NMR spectrum for PSf-CH$_2$Cl. Grafting of POEM onto PSf-CH$_2$Cl resulted in the appearance of well-defined peaks in the region 3.2-4.3 ppm (O—CH$_x$) entirely analogous to those observed for the POEM-grafted copolymers of PVC and PVDF. For PSf-g-POEM, the mole fraction of POEM was roughly estimated from the ratio of the peak intensities of the O—CH$_x$ and aromatic C—H resonances. The estimated composition so obtained appears in Table 1.

Thin Film Preparation. PVC, PVDF, cPE, cPP, PSf, and their corresponding POEM-grafted derivatives were separately dissolved in appropriate solvents to obtain solutions composed of 2-3 wt % polymer. In addition, PVC and PVC-g-POEM were codissolved for the preparation of polymer blends containing 5, 10, 20, 40, and 60 wt % PVC-g-POEM. The solvents used were THF (PVC and cPP and their copolymers), toluene (cPE and its copolymers), chloroform (PSf and its copolymer), and methyl ethyl ketone (at 80° C., PVDF and its copolymer). Thin films were spin coated at 2000 rpm onto silicon wafers (PVDF, PSf, cPE and cPP) or glass coverslips (PVC). In order to promote adhesion of PVDF homopolymer to the silicon oxide surface, it was necessary to surface-modify the substrate using a fluorinated chlorosilane, (tridecafluoro-1,1,2,2-tetrahydrooctyl)-1-dimethylchlorosilane. Covalent coupling of the chlorosilane to the surface was accomplished by immersion of the substrates in a 2 wt % solution of the chlorosilane in ethanol at 30° C. for 10 min., followed by a curing step for 10 min. at 110° C. in air. Thin films were held under vacuum overnight to remove all residual solvent. Some of the PVC-based films were autoclaved at 121° C. while immersed in deionized water (dW, Millipore Milli-Q, 18.2 MΩcm). This treatment was intended to simulate the repeated autoclave sterilizations to which some PVC medical devices are subjected.

Thin Film Characterization. Contact Angle Measurements. Advancing and receding contact angle measurements (Advanced Surface Technologies, Inc. VCA2000) were performed on thin films and using dW.

X-Ray Photoelectron Spectroscopy. XPS was performed on thin films to determine their near-surface compositions. XPS was conducted on a Surface Science Instruments SSX-100 spectrometer (Mountain View, Calif.) using monochromatic Al Kα x-rays (hν=1486.7 eV) with an electron takeoff angle of 45° relative to the sample plane. Survey spectra were run in the binding energy range 0-1000 eV, followed by high-resolution spectra of the C 1s region. Peak fitting of the C 1s region was conducted with a linearly subtracted background and with each component of the C 1s envelope described by a Gaussian-Lorentzian sum function, as detailed in a previous publication (Hester, J. F.; Banerjee, P.; Mayes, A. M. *Macromolecules* 1999, 32, 1643).

Static Protein Adsorption Measurements. To investigate the protein resistance of blends of PVC and PVC-g-POEM, PVC-based thin films were immersed in a solution containing bovine serum albumin (BSA Fraction V, Sigma). Films were washed with phosphate-buffered saline (0.01 M PBS pH 7.4) for 1 h, then incubated in PBS containing 10.0 g/l BSA for 24 h at room temperature, and washed for 5 min. in three changes of PBS followed by three changes of dW. Finally, samples were dried in a vacuum oven at room temperature. Surface coverage of BSA was quantified using XPS, by detection of nitrogen occurring in BSA. Survey spectra were run in the binding energy range 0-1000 eV, and the near-surface atomic compositions were determined using numerically integrated peak areas and applying standard sensitivity coefficients.

Cell Culture Experiments. Cell attachment studies were performed to evaluate the biocompatibility of PVC/PVC-g-POEM blends. NR6 fibroblasts transfected with wild-type human epidermal growth factor receptor (WT NR6) were cultured in modified Eagle's medium (MEM-α) supplemented with 7.5% fetal bovine serum, L-glutamine, non-essential amino acids, sodium pyruvate, penicillin-streptomycin, and gentamycin antibiotic. Cell attachment studies were performed on thin films by placing the samples in tissue culture polystyrene wells and seeding ~34,000 cells/cm$^2$ onto each polymer surface in 1 ml of serum-containing growth factor medium. Samples were incubated for 24 h at 37° C., after which the adhesion and morphology of cells were assessed using a Zeiss Axiovert 100 phase contrast microscope.

Contact Angle Measurements on Pure Graft Copolymers. Water contact angles for the pure parent halogenated polymers and their POEM-grafted copolymers appear in Table 1. The standard deviations of all water contact angles listed in Table 1 were <2°. Both advancing and receding contact angles measured on films of the pure graft copolymers were substantially reduced compared to the corresponding parent polymers. PVDF-g-POEM[b] was particularly notable, with a receding contact angle of ~0°. The high degree of contact angle hysteresis exhibited by the graft copolymers suggests that substantial surface reorganization occurs upon contact of these materials with water. Though hydrophilic and water-absorbent, none of the graft copolymers were water-soluble.

Contact Angle Measurements on PVC-Based Blends. PVC-based blend thin films containing 5-60 wt % PVC-g-POEM[b] were optically clear, both in the as-cast condition and after autoclaving for 6 h at 121° C., indicating that no phase separated structures larger than the wavelength of light exist in these blends. Advancing and receding water contact angles for as-cast PVC-based films containing 0, 5, 10, 20, 40, 60, and 100 wt % PVC-g-POEM[b] are listed in Table 2. The standard deviations for all measurements were <2°. Addition of the graft copolymer additive significantly reduces both the advancing and receding contact angles. The surface compositions of as-cast blends were estimated based on the contact angles of the pure components using the equation of Israelachvili and Gee (Israelachvili, J. N.; Gee, M. L. *Langmuir* 1989, 5, 288):

$$(1+\cos\theta_{eq})^2 = \phi_{PVC}(1+\cos\theta_{eq,PVC})^2 \phi_{copolymer}(1+\cos\theta_{eq,copolymer})^2 \quad (7)$$

where $\theta_{eq}$ is the equilibrium contact angle on the blend, $\phi_x$ is the near-surface volume fraction of component x, and $\theta_{eq,x}$ is the equilibrium contact angle on pure component x. In all cases, $\theta_{eq}$ was taken as the average of $\theta_{adv}$ and $\theta_{rec}$. The estimated surface compositions are reported in Table 2. Equation 7 is expected to provide only a very rough estimate of the surface composition, particularly for a system with such large contact angle hysteresis. Nevertheless, the results suggest that preferential surface localization of PVC-g-POEM may occur in as-cast spin coated blends with PVC, due to differences between the precipitation rates of the two components from THF solution.

TABLE 2

Properties of As-Cast PVC/PVC-g-POEM[b] Films

| Bulk Composition (wt % PVC-g-POEM[b]) | Contact Angle (°) | | Apparent Surface Composition[†] (wt %) |
|---|---|---|---|
| | $\theta_{adv}$ | $\theta_{rec}$ | |
| 0 | 90.2 | 82.3 | 0 |
| 5 | 80.9 | 68.6 | 20 |
| 10 | 74.0 | 57.2 | 39 |
| 20 | 67.7 | 45.3 | 59 |
| 40 | 61.3 | 38.0 | 74 |
| 60 | 54.3 | 36.1 | 84 |
| 100 | 42.6 | 32.4 | 100 |

[†]Estimated using Equation (5)

Figure 10:
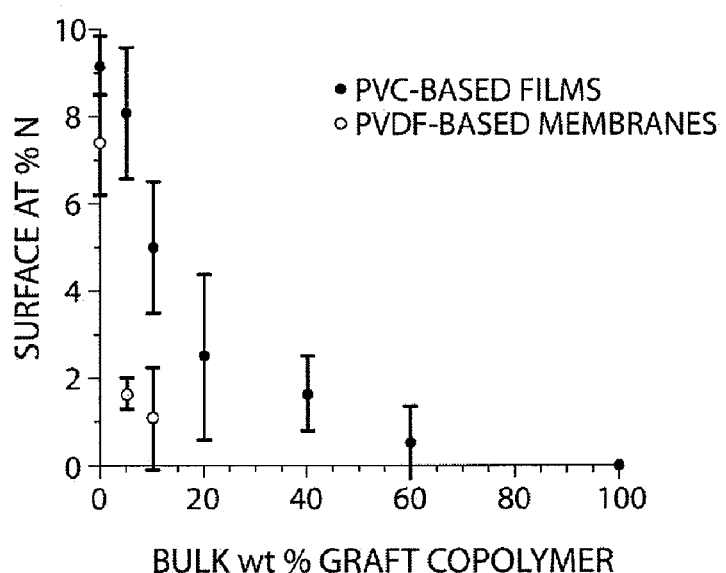
FIG. 10 shows surface atomic percent nitrogen as a function of graft copolymer content detected by XPS on the surfaces of as-cast PVC-based films (closed symbols) and PVDF-based membranes (open symbols) for samples incubated in 10.0 g/L bovine serum albumin solution for 24 h at 20° C.

Protein Adsorption Resistance of PVC-Based Blends. The near-surface compositions of as-cast PVC-based films exposed to BSA solution for 24 h were obtained by integration of the following peaks in the XPS spectrum: Cl 2p (201 eV), C 1s (285 eV), N 1s (399 eV), and O 1s (531 eV). The near-surface concentration of nitrogen occurring in BSA is plotted as a function of blend composition in FIG. 10. Considerable resistance to BSA adsorption is achieved in blends containing as little as 10-20 wt % PVC-g-POEM[b]. BSA was not detectable on pure PVC-g-POEM[b] films exposed to BSA solution.

Cell Resistance of PVC-Based Blends. The morphologies of NR6 fibroblast cells cultured for 24 h on PVC-based films are shown in FIG. 11. In all cases, cells were observed to be confluent on the tissue culture polystyrene surrounding the samples, indicating no evidence of toxicity. Cells cultured on pure PVC in the as-cast condition (FIG. 11a) adhere, and many spread or begin to spread (black arrows). On as-cast films containing between 10 wt % (FIG. 11b) and 100% (FIG. 11c) PVC-g-POEM[b], very few cells adhere, and those cells found on the surface are rounded or agglomerated, indicating very weak adhesion. Thus, as little as 10% of the graft copolymer additive results in a dramatic enhancement in the bioinertness of the PVC surface.

On as-cast PVC films autoclaved for 6 h in water at 121° C. (FIG. 11d), fibroblasts adhere at a high density and spread strongly, indicating strong attachment. XPS analysis was performed to elucidate any differences in surface chemistry between as-cast and autoclaved pure PVC films which might explain the significantly enhanced cell attachment after autoclaving. The near-surface atomic compositions of the films, obtained by integration of the C 1s, Cl 2p, and O 1s peaks in the XPS survey spectra, appear in Table 3. The as-cast film has a Cl/C atomic ratio of nearly 0.5, as expected based on the stoichiometry of PVC. Autoclaving results in a marked reduction in the Cl/C ratio, as well as the appearance of a significant amount of oxygen.

TABLE 3

Near-Surface Compositions of As-Cast and Autoclaved Pure PVC Films

| | Near-Surface at % | | | Atomic Ratio |
|---|---|---|---|---|
| | C | Cl | O | Cl/C |
| As-Cast PVC | 66.27 | 33.73 | — | 0.51 |
| Autoclaved PVC | 69.10 | 20.93 | 9.97 | 0.30 |

Figure 12A:
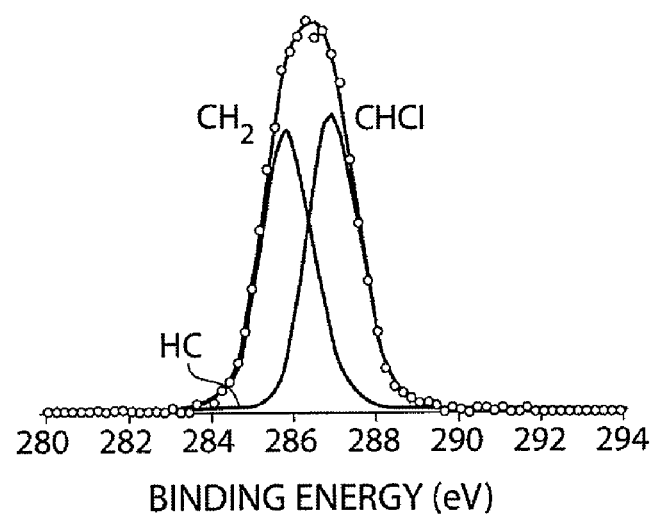
FIG. 12 shows high-resolution C 1s XPS spectra for pure PVC films in the (a) as-cast condition, and (b) after autoclaving for 6 h at 121° C. while immersed in water.
Figure 12B:
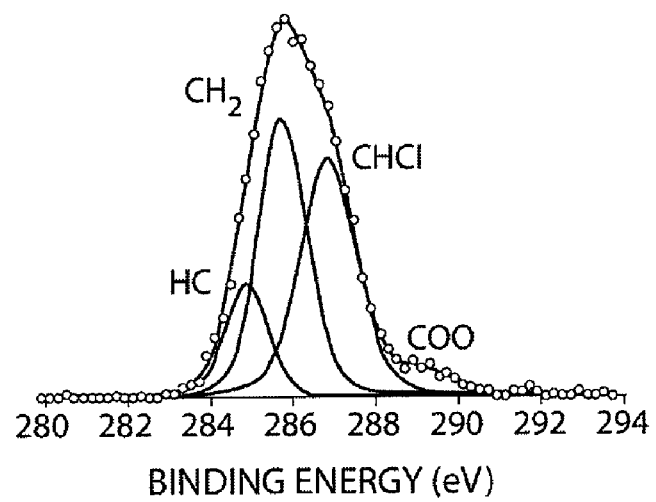
Figure 13A:
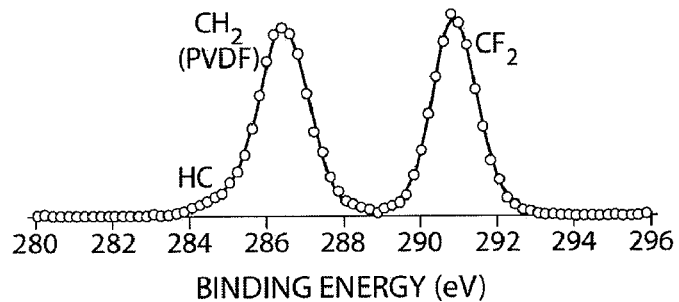
FIG. 13 shows fitted C 1s envelopes for (a) pure PVDF membrane, (b) evaporation cast film of pure PVDF-g-POEM$^b$, (c) membrane containing 5 wt % PVDF-g-POEM$^b$, and (d) membrane containing 10 wt % PVDF-g-POEM$^b$; for (b), (c), and (d), the computed bulk and surface compositions are noted in terms of weight fraction of POEM; for (b), the surface composition is an average from two samples.
Figure 13B:
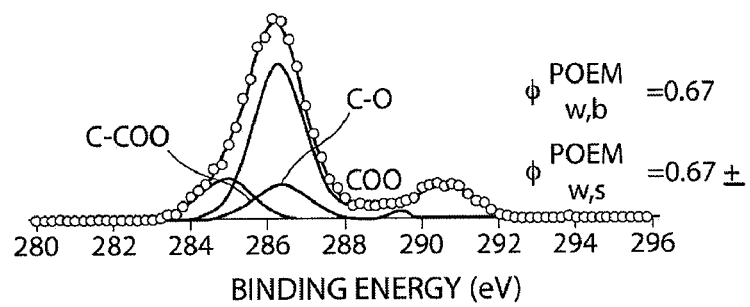
Figure 13C:
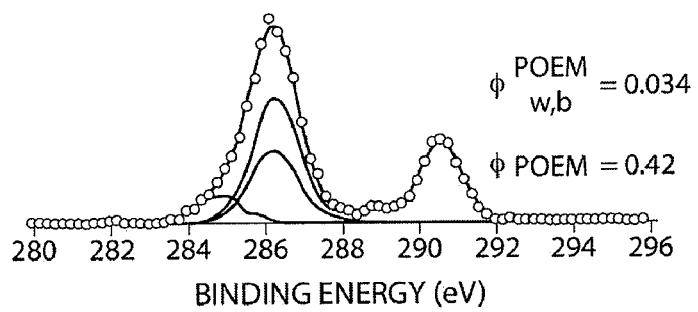
Figure 13D:
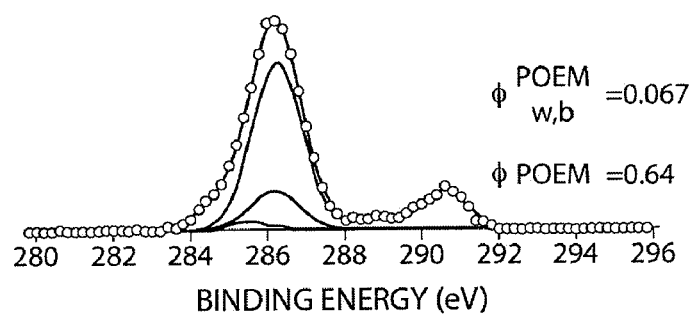

High-resolution scans of the C 1s regions of the XPS spectra appear in FIG. 12. The pure PVC spectrum (FIG. 12a) was fit (±1 eV) with the two well-known peaks of equal area centered at 285.90 eV ($CH_2$) and 287.00 eV (CHCl), as well as a peak at 285.00 eV corresponding to a small amount of hydrocarbon contamination. Fitting of the spectrum for autoclaved PVC (FIG. 12b) required an additional peak to account for the obvious shoulder at high binding energy. The best fit was obtained with the additional peak positioned at ~289.24 eV, consistent with the presence of carboxylic acid, which has been assigned a position of 289.26 eV using high-resolution equipment. The above results are consistent with thermal degradation of PVC during autoclaving, resulting in dehydrochlorination and the incorporation of oxygenated groups into the film surface. Thermal, photo-induced, and radiation-induced degradation of PVC in the presence of oxygen have been known to result in the creation of polar hydroperoxy and carboxylic acid groups, which might be expected to facilitate cell adhesion.

Figure 11A:
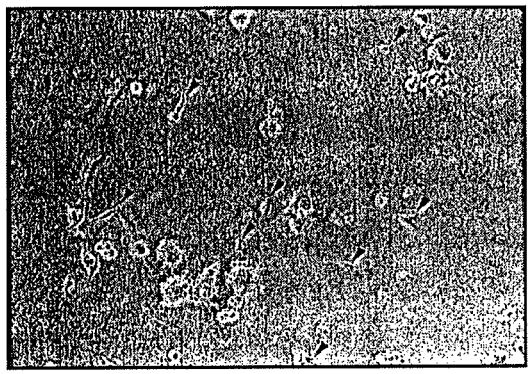
FIG. 11 shows morphologies of cells incubated for 24 h on as-cast films composed of (a) pure PVC, (b) PVC plus 10 wt % PVC-g-POEM$^b$, and (c) pure PVC-g-POEM$^b$, and on autoclaved films composed of (d) pure PVC, (e) PVC plus 10 wt % PVC-g-POEM$^b$, and (f) pure PVC-g-POEM$^b$; autoclaving was done for 6 h at 121° C., with the samples immersed in deionized water; spread or spreading cells are indicated with arrows; magnification is 10X.
Figure 11B:
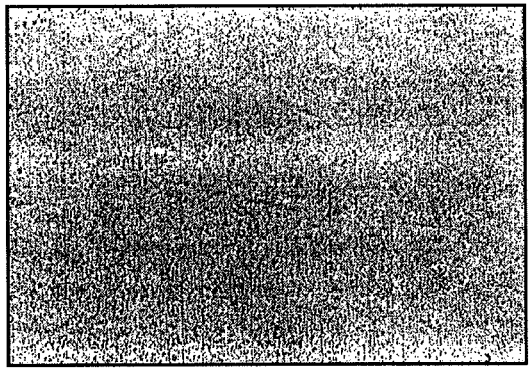
Figure 11C:
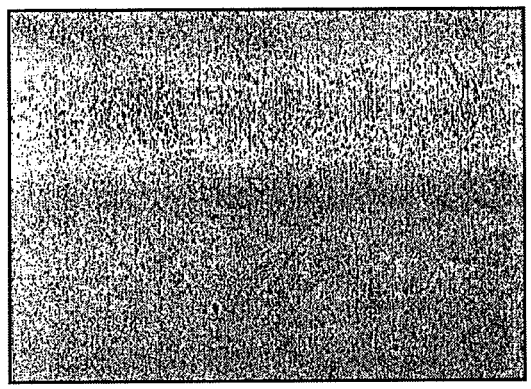
Figure 11D:
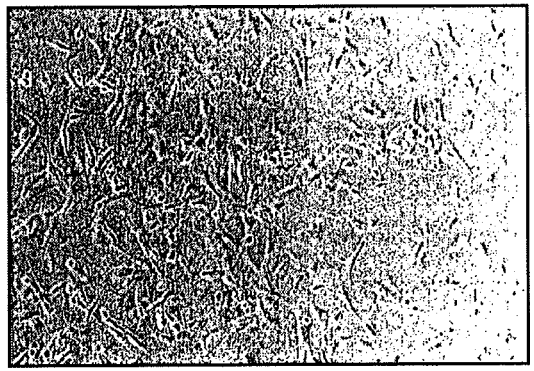
Figure 11E:
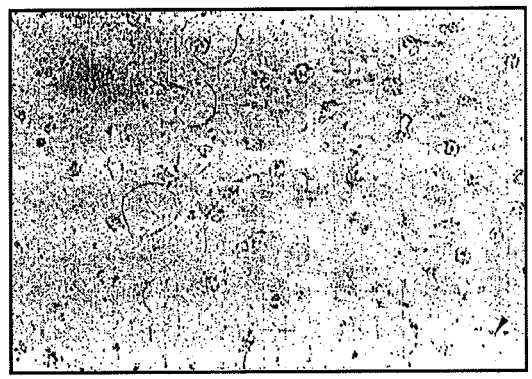
Figure 11F:
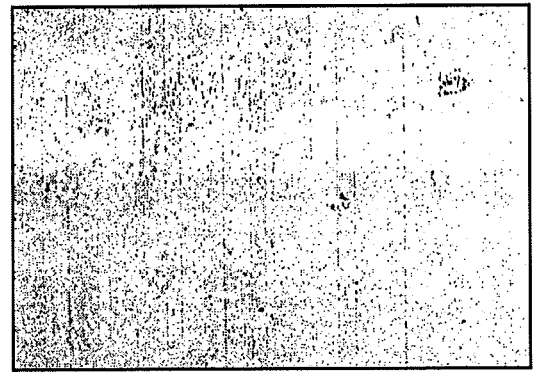

Fibroblasts exhibit a much lower affinity for autoclaved films containing 10 wt % PVC-g-POEM[b] (FIG. 11e). On these films, most cells appear rounded or agglomerated. An occasional cell (arrow) spreads on these surfaces. As the concentration of graft copolymer additive in autoclaved films is increased, the density of cells observed on the surfaces decreases and the occasional spreading is suppressed, such that no spreading is observed on films composed of 40 to 100% (FIG. 11f) PVC-g-POEM[b]. The fact that PVC blends containing the graft copolymer additive appear to retain much of their bioinert character after extensive oxidative degradation is significant, as degradation is a potential issue during routine sterilization of PVC medical devices.

EXAMPLE 3

Membranes

Materials. $PVDF_{534K}$ ($\overline{M}_w$ ca. 534 000 g/mol), $PVDF_{250K}$ ($\overline{M}_n$ ca. 107 000 g/mol, $\overline{M}_w$ ca. 250 000 g/mol), and polysulfone (PSf) ($\overline{M}_n$ ca. 26 000 g/mol) were purchased from Aldrich Chemical Co. (Milwaukee, Wis.) and used as received.

Membrane Preparation. Membranes were prepared from casting solutions containing polymer(s), glycerol, and N,N-dimethylacetamide (DMAc) according to the compositions listed in Table 4. After filtering and degassing, each solution was cast onto a first-surface optical mirror (Edmund Scientific Co., Barrington, N.J.) under a casting bar having an 8-mil gate size. The mirror was then immersed in a bath of dW at 90° C. The membrane was removed from the bath after complete separation from the mirror and immersed overnight in a second dW bath at 20° C. Finally, membranes were dried in air at 20° C. Membranes of type I, II, and III contained 0, 5, and 10 wt % PVDF-g-POEM, respectively. Membranes of type IV and V contained 0 and 10 wt % PVDF-g-PMAA, respectively.

TABLE 4

Compositions of Membrane Casting Solutions

| | g/100 g casting solution | | | | | | |
|---|---|---|---|---|---|---|---|
| | I | II | III | IV | V | VI | VII |
| $PVDF_{534K}$ | 18.0 | 18.0 | 18.0 | — | — | — | — |
| $PVDF_{250K}$ | — | — | — | 18.0 | 18.0 | — | — |
| PSf | — | — | — | — | — | 20.0 | 18.0 |
| PVDF-g-POEM | — | 0.95 | 2.0 | — | — | — | — |
| PVDF-g-PMAA | — | — | — | — | 2.0 | — | — |
| PSf-g-POEM | — | — | — | — | — | — | 2.0 |
| glycerol | 3.3 | 1.0 | 1.0 | 10.0 | 10.0 | — | — |
| DMAc | 78.7 | 80.1 | 79.0 | 72.0 | 70.0 | 80.0 | 80.0 |

Membrane Characterization. Contact angle measurements, XPS analysis, and static protein adsorption experiments were performed on membranes as described above for thin film coatings.

Near-Surface Compositions of PVDF-Based Blend Membranes. Membranes Containing PVDF-g-POEM. The near-surface compositions of PVDF membranes containing 5-10 wt % PVDF-g-POEM[a] and PVDF-g-POEM[b], as well as a thin-film sample of pure PVDF-g-POEM[b], were determined by fitting the C 1s regions of their XPS spectra. The pure graft copolymer film was prepared by evaporation casting from a 5% solution in DMAc, and its surface composition is expected to represent an equilibrium composition due to the slow evaporation time. The peak centers of the component peaks, referenced to the hydrocarbon peak at 285.0 eV, were constrained (±1 eV) as follows: C—COO, 285.72 eV; $CH_2$ (PVDF), 286.44 eV; C—O, 281.50 eV; COO, 289.03 eV; and $CF_2$, 290.90 eV. These values correspond to values obtained from pure PVDF, PMMA, and PEO homopolymers using high-resolution instrumentation. The areas of the $CH_2$ and $CF_2$ peaks of the PVDF component were constrained to be equal as required by stoichiometry, as were the C—COO and COO peaks of the methacrylate environment. The ratio of the C—O and COO peak areas was constrained to its stoichiometric value of 18. For all membranes, XPS analysis was conducted on the side of the membrane facing the water bath during the precipitation step of fabrication. In membrane separations, it is this side of the membrane which contacts the feed solution.

Membranes Containing PVDF-g-PMAA. The C 1s regions of the XPS spectra for membranes containing PVDF-g-PMAA were fit with five component peaks. The peak centers,

TABLE 5

C 1s Component Peak Areas as Percentages of Total Area for Pure PVDF-g-POEM[b] and for Membranes Containing PVDF-g-POEM

| Sample | HC | C—COO | $CH_2$ (PVDF) | C—O (PEO) | COO | $CF_2$ |
|---|---|---|---|---|---|---|
| Membrane, Pure PVDF | 3.77 | — | 48.12 | — | — | 48.12 |
| Membrane, 10 wt % PVDF-g-POEM[a] | 5.52 | 1.57 | 31.52 | 28.29 | 1.57 | 31.52 |
| Membrane, 5 wt % PVDF-g-POEM[b] | 7.42 | 2.26 | 23.60 | 40.86 | 2.26 | 23.60 |
| Membrane, 10 wt % PVDF-g-POEM[b] | 8.64 | 3.23 | 13.31 | 58.27 | 3.23 | 13.31 |
| Pure PVDF-g-POEM[b] | 11.48 | 3.30 | 11.19 | 59.54 | 3.30 | 11.19 |

Figure 14A:
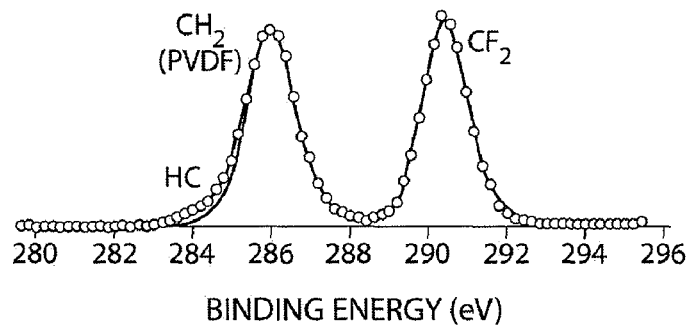
FIG. 14 shows fitted C 1s envelopes for (a) pure PVDF membrane, (b) evaporation cast film of pure PVDF-g-PMAA, and (c) membrane containing 10 wt % PVDF-g-PMAA; for (b) and (c), the computed bulk and surface compositions are noted in terms of weight fraction of PMAA; for (b), the surface composition is an average from two samples.
Figure 14B:
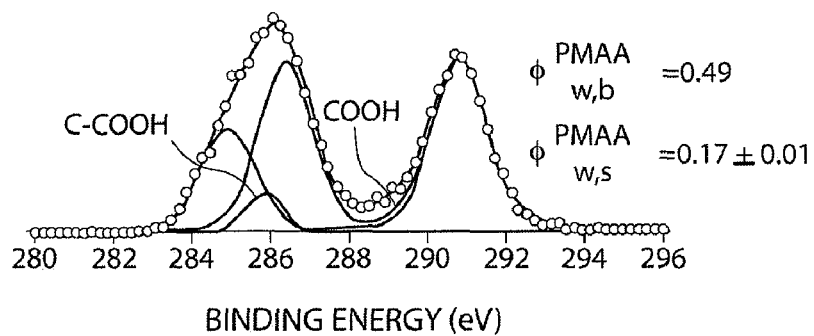
Figure 14C:
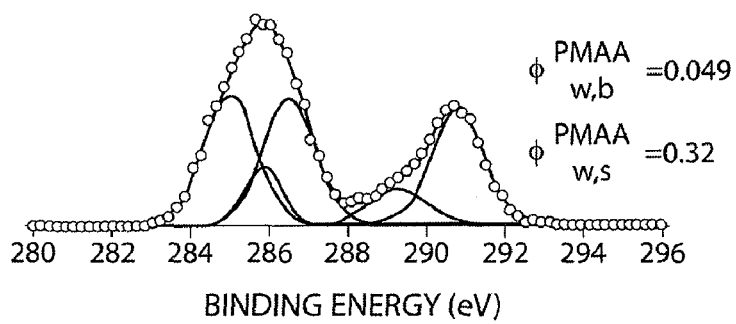

Component peak area percentages for the membranes and for pure PVDF-g-POEM[b] are listed in Table 5. Plots of the fitted C 1s spectra for membranes containing 0, 5, and 10 wt % PVDF-g-POEM[b] appear in FIG. 13. The near-surface mole fraction of POEM was calculated using the formula, $$X_s^{POEM} = \frac{A_{COO}}{A_{COO} + A_{CF_2}} \quad (8)$$

where $A_{COO}$ and $A_{CF_2}$ are the areas of the fitted COO and $CF_2$ peaks, respectively. The near-surface POEM contents, converted to weight percent, are listed in Table 6, along with the bulk POEM contents. Clearly, significant surface segregation of the amphiphilic graft copolymer in PVDF occurs during the single-step fabrication of the membranes by immersion precipitation, due to the relatively low interfacial energy between the amphiphilic component and water. Thus, for membranes containing 5 and 10 wt % PVDF-g-POEM[b], the graft copolymer additive is the major component of the ~60-Å thick near-surface region of the membrane analyzed by XPS, even though it is the minor component of the membrane as a whole.

referenced to the hydrocarbon peak at 285.0 eV, were constrained (±1 eV) as follows: C—COOH, 285.80 eV; $CH_2$ (PVDF), 286.44 eV; COOH, 289.33 eV; and $CF_2$, 290.90 eV, according to previously determined peak positions for PVDF and PMAA homopolymers. The areas of the $CH_2$ and $CF_2$ peaks of PVDF were constrained to be equal, as were the areas of the C—COOH and COOH peaks. FIG. 14 shows fitted C 1s envelopes for (a) a pure PVDF membrane, (b) a pure PVDF-g-PMAA film evaporation cast from DMAc, and (c) an as-cast membrane with a bulk composition of 10 wt % PVDF-g-PMAA. Component peak area percentages for the samples are listed in Table 7. The near-surface mole fraction of PMAA was calculated from the XPS fits as, $$n_s^{PMAA} = \frac{A_{COOH}}{A_{CH_2(PVDF)} + A_{COOH}}. \quad (9)$$

Bulk and near-surface compositions for each sample appear in FIG. 14.

TABLE 6

Properties of PVDF-Based Membranes

| Casting Solution Type | Membrane Composition | Comonomer Content (wt %) Bulk | Comonomer Content (wt %) Surface | $\theta_{adv}$, initial | Wetting Behavior |
|---|---|---|---|---|---|
| I | Pure PVDF | 0 | 0 | 89.9 ± 4.1 | nonwetting |
| III | 10 wt % PVDF-g-POEM[a] | 4.4 | 27 | 76.5 ± 3.7 | partial wetting[†] |
| II | 5 wt % PVDF-g-POEM[b] | 3.4 | 42 | 60.4 ± 2.3 | wetting, 147 ± 83 s[‡] |
| III | 10 wt % PVDF-g-POEM[b] | 6.7 | 64 | 53.5 ± 7.0 | wetting, 16 ± 10 s[‡] |
| V | 10 wt % PVDF-g-PMAA | 4.9 | 29 | 75.6 ± 1.0 | partial wetting[†] |

[†]Defined as partial translucence of a previously dry membrane after immersion in water for 12 h;
[‡]Time required for a 1 μl drop of water placed on the membrane surface to reach a contact angle of 0°.

TABLE 7

C 1s Component Peak Areas as Percentages of Total Area for Pure PVDF-g-PMAA and for Membrane Containing PVDF-g-PMAA

| Sample | HC | C—COOH | $CH_2$ (PVDF) | COOH | $CF_2$ |
|---|---|---|---|---|---|
| Pure PVDF-g-PMAA film | 21.83 | 5.41 | 33.68 | 5.41 | 33.68 |
| 10 wt % PVDF-g-PMAA Membrane | 28.74 | 9.19 | 26.44 | 9.19 | 26.44 |

The near-surface concentration of PMAA in the pure comb films, which were evaporation cast under the same slow conditions used in the preparation of the PVDF-g-POEM films, was significantly lower than its bulk concentration as measured by $^1$H NMR. This result suggests that PMAA is grafted onto PVDF in the form of long side chains capable of strong orientation away from the air surface to maximize exposure of the low-energy fluorinated backbone. The near-surface composition of the as-cast membrane (c) indicates substantial surface localization of PVDF-g-PMAA as well as surface expression of PMAA, such that the near-surface PMAA concentration is over 6 times the bulk concentration.

Near-Surface Compositions of PSf-Based Blend Membranes Containing PSF-g-POEM. The near-surface compositions of pure PSf membranes and PSf membranes containing 10 wt % PSf-g-POEM were determined by fitting the C 1s regions of their XPS spectra. The peak centers of the component peaks, referenced to the hydrocarbon peak at 285.0 eV, were constrained (±1 eV) as follows: aromatic C, 284.70 eV; aromatic C—SOO, 285.31 eV; C—COO, 285.72 eV; aromatic C—O, 286.34 eV; $CH_2$—O (PEO), 286.45 eV; and COO, 289.03 eV. These values correspond to values obtained from pure PSf and PEO homopolymers using high-resolution instrumentation. The areas of the aromatic C—SOO and aromatic C—O peaks of the PSf component were constrained to be equal as required by stoichiometry, as were the C—COO and COO peaks of the methacrylate environment.

amphiphilic graft copolymer in PSf occurs during the single-step fabrication of the membranes by immersion precipitation, due to the relatively low interfacial energy between the amphiphilic component and water. Thus, for membranes containing 10 wt % PSf-g-POEM, the graft copolymer additive is the major component in the ~60-Å thick near-surface region of the membrane characterized by XPS, even though it is the minor component in the membrane as a whole.

Wettability of PVDF-Based Membranes. PVDF membranes modified with amphiphilic graft copolymers of PVDF exhibit enhanced wettability. A droplet of water placed on a pure PVDF membrane assumes a high contact angle, which changes very little over time until the drop finally evaporates. In contrast, a water droplet placed on a membrane containing 5-10 wt % PVDF-g-POEM$^b$ assumes a moderate initial contact angle (>50°) which decreases to zero over time and ultimately wets through the membrane. This behavior is termed spontaneous wetting. Herein, the wettability of a membrane was assessed based on the initial advancing contact angle ($\theta_{adv}$) of a 1 μL droplet of dW placed on its surface, as well as the time required for the contact angle of the droplet to reach 0°. These values are reported in Table 6. The delayed wetting behavior of membranes modified with PVDF-G-POEM$^b$ indicates local surface reorganization to express POEM upon contact with water.

Most notable for their wetting behavior are membranes prepared from blends containing PVDF-g-POEM$^b$. A membrane containing only 5 wt % of this additive (corresponding to a bulk POEM concentration of only 3.4 wt %) is spontaneously wettable on a time scale of 2-3 minutes. The time needed for complete wetting can be reduced to just a few seconds with the incorporation of 10 wt % PVDF-g-POEM$^b$. Membranes containing 10 wt % PVDF-g-POEM$^a$ (which has a lower POEM content than PVDF-g-POEM$^b$) or PVDF-g-PMAA do not spontaneously wet. When immersed in water for several hours, however, some regions of these membranes become translucent, indicating partial wetting. Pure PVDF membranes show no such behavior. It is of interest to compare this observation with results obtained previously from PVDF

TABLE 8

C 1s Component Peak Areas as Percentages of Total Area for Membranes Containing PSf-g-POEM

| Sample | Aromatic C | HC | Aromatic C—SOO | C—COO | Aromatic C—O | $CH_2$—O (PEO) | COO |
|---|---|---|---|---|---|---|---|
| Membrane, Pure PSf | 73.08 | 11.54 | 7.69 | — | 7.69 | — | — |
| Membrane, 10 wt % PSf-g-POEM | 54.81 | 14.55 | 5.63 | 2.49 | 5.63 | 14.94 | 1.95 |

Component peak area percentages for the membranes and for pure PVDF-g-POEM$_b$ are listed in Table 8. The near-surface mole fraction of POEM was calculated using the formula, $$X_s^{POEM} = \frac{(A_{PEO}/2.96)}{(A_{PEO}/2.96) + (A_{aromaticC-O}/2)} \qquad (10)$$

where $A_{COO}$ and $A_{aromaticC-O}$ are the areas of the fitted COO and Aromatic C—O peaks, respectively. The near-surface POEM content of the blend membrane, converted to weight percent, is 59 wt % compared to the bulk POEM content of 5 wt %. Clearly, significant surface segregation of the membranes containing the comb additive P(MMA-r-POEM) (Hester, J. F.; Banerjee, P.; Mayes, A. M. *Macromolecules* 1999, 32, 1643). This additive had a POEM content of 50 wt % (greater than that of PVDF-g-POEM$_a$), and the membranes were fabricated under similar processing conditions. Although PVDF membranes containing P(MMA-r-POEM) displayed substantially enhanced fouling resistance, they exhibited neither spontaneous nor "partial" wetting behavior.

Protein Adsorption Resistance of Membranes Containing PVDF-g-POEM. The presence of POEM at the membrane surface results in significant resistance to protein adsorption. The near-surface nitrogen content of membranes exposed to BSA solution for 24 h was obtained by integration of the following peaks in the XPS survey spectra: C 1s (285 eV), N 1s (399 eV), O 1s (531 eV), and F 1s (685 eV). The near-surface concentration of nitrogen from adsorbed is plotted as a function of bulk blend composition in FIG. 10. Compared to PVC/PVC-g-POEM$^b$ blends of equal graft copolymer content (see above), PVDF membranes containing PVDF-g-POEM$^b$ are significantly more protein resistant. This result is likely due to the high degree of surface segregation of PVDF-g-POEM$^b$ which occurs during membrane processing. Indeed, a dramatic reduction in protein adsorption is achieved with a bulk graft copolymer concentration of only 5 wt %.

pH-Dependent Filtration Characteristics of Membranes Containing PVDF-g-PMAA. Control over pore size at the level of Angstroms is difficult during membrane fabrication by immersion precipitation. Even worse, the separation characteristics of membranes always change with time during operation due to fouling and pore compaction. Thus, polymer membranes are currently not very effective in applications such as the fractionation of macromolecules (e.g., proteins). To address this issue, recent work has opened an intriguing new avenue of research directed toward the development of environmentally responsive (ER) membranes. These so-called "intelligent" membranes can adjust their own pore sizes in response to environmental stimuli. Thus, for protein separation, one might envision the employment of an ER membrane in concert with a feedback loop capable of continuously measuring the size of the permeating solute and adjusting some feed solution attribute to maintain the desired separation characteristics.

The most widely studied ER membranes are prepared by the surface graft polymerization of weak polyacid chains onto a support membrane (for example, Ito, et al., *Journal of the American Chemical Society* 1997, 119, 1619-1623). Monomers commonly used in this approach include acrylic acid and methacrylic acid. The weak acid groups on the grafted chains become negatively charged through the dissociation of a proton, $$HA = A^- + H^+ \tag{11}$$

and the degree of dissociation depends sensitively on the local pH and ionic strength. At high pH, the degree of dissociation is high, and mutual repulsion between neighboring like charges causes the chains to assume an extended conformation, closing the membrane pores. At low pH, the chains become essentially neutral and assume a relatively more collapsed configuration, opening the pores. Thus, the chains provide a mechanochemical "pore valve" by which separation characteristics and trans-membrane flux can be controlled simply through adjustment of the feed solution pH or ionic strength. This effect is completely reversible and quite dramatic—the difference in trans-membrane flux between the "open" and "closed" pore conditions can be greater than an order of magnitude. ER membranes sensitive to pH and to glucose concentration have been evaluated for use as drug delivery capsules, which would release a drug at appropriate times in response to an environmental stimulus. Membranes having grafted chains capable of photonically and thermally induced conformational changes have also been fabricated.

Filtration measurements were performed on membranes containing PVDF-g-PMAA to assess the pH-dependence of their permeability. Membranes were autoclaved for 1 h in water at 121° C. prior to these experiments. The purpose of this step was to eliminate a small, irreversible pH-dependence of the flux through as-cast pure PVDF membranes. This behavior may be a result of pH-dependent swelling of amorphous PVDF. Heat treatment of the membranes at 121° C. ($>0.7 \cdot T_m$) may facilitate crystallization of PVDF quenched into the amorphous state during coagulation. A 25-mm diameter circular membrane was mounted in an Amicon 8010 stirred, dead-end UF cell (Millipore) having an effective filtration area of 4.1 cm$^2$. Delivery of feed solution to the cell was provided by a stainless steel dispensing pressure vessel (Millipore) pressurized by a nitrogen cylinder. To simulate the flow conditions in an actual filtration operation, a stir bar mounted above the membrane worked in conjunction with a speed-adjustable stir plate (VWR) to provide a constant and measured fluid velocity parallel to the membrane surface. Each membrane was prewet with methanol, then immersed in dW for 30 min. before it was loaded into the cell.

Buffered solutions of pH 2-8 were prepared by the addition of prepackaged buffer salts (Hydrion™, Aldrich) to dW. After mounting in the UF cell, the membrane was pre-compacted by filtration of pH 8 buffer at an elevated compaction pressure $P_c$ for 60 min., followed by filtration of pH 8 buffer at the measurement pressure $P_m$ for 30 min. The values of $P_c$ and $P_m$, listed in Table 9, varied based on the membrane type.

TABLE 9

Compaction and Measurement Pressures Used in pH Response Studies

| Membrane | $P_c$ (psig) | $P_m$ (psig) |
|---|---|---|
| Pure PVDF | 70 | 50 |
| 10 wt % PVDF-g-PMAA | 20 | 5 |

Following pre-compaction, the pressure vessel was emptied, such that nitrogen gas was delivered directly to the UF cell. The cell was then successively emptied and filled with buffers of various pH, and the flux of each solution was measured gravimetrically at pressure $P_m$. Each measurement consisted of a 1-min. equilibration period, followed by a gravimetric flux measurement over a second 1-min. period. To assess the reversibility of the pH response, the trans-membrane flux was first measured during 10 cycles consisting of a pH 8 measurement followed by a pH 2 measurement. Following this test, the pH dependence of the trans-membrane flux was quantified through successive measurements at pH 2-8, in intervals of one pH unit. All of the compaction and filtration steps were performed at 20° C. with a stirring speed of 500 rpm.

Figure 15:
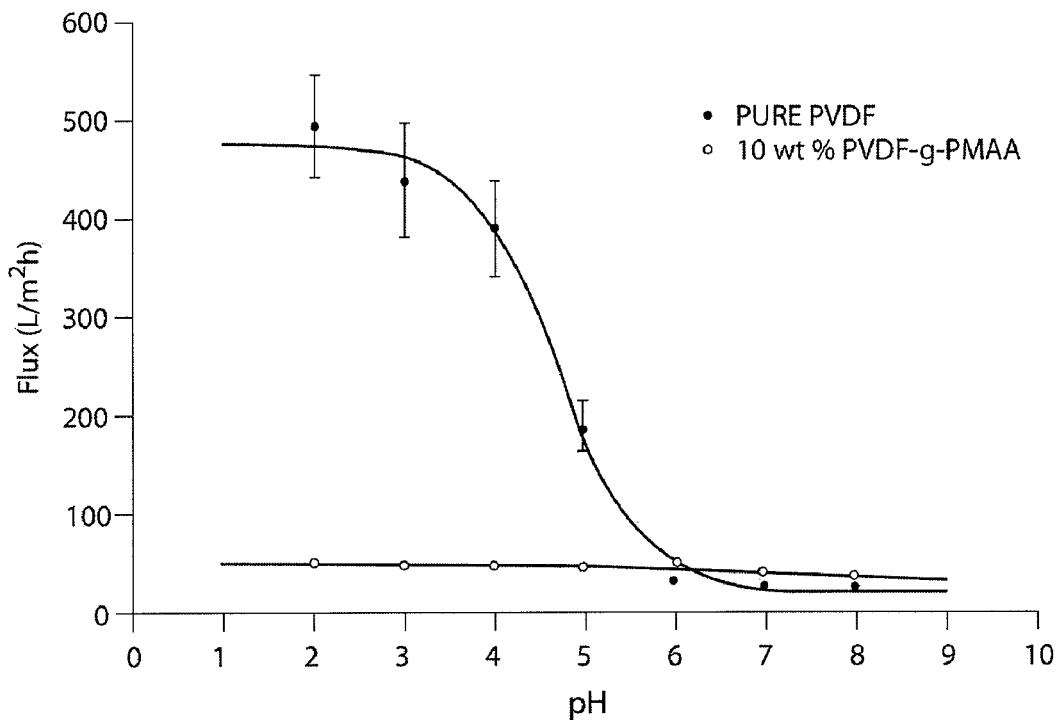
FIG. 15 shows pH-dependence of flux through membrane containing PVDF-g-PMAA via a plot of buffer solution flux versus pH for a pure PVDF membrane and membranes having a bulk composition of 10 wt % PVDF-g-PMAA, after autoclaving for 1 h in water at 121° C.

FIG. 15 is a plot showing the pH dependence of the flux of buffer solutions through autoclaved membranes having surface-localized PVDF-g-PMAA. The data points for the blend are averages of data taken from three different membranes. The self-organizing membranes exhibit a flux variation of well over an order of magnitude, from a flux of 506.5 L/m$^2$ h at pH 2 to 29.0 L/m$^2$ h at pH 8. An autoclaved pure PVDF membrane exhibits very little flux variation with pH. The solid lines in FIG. 15 are best-fit symmetric functions of the form,

$$J = C - D\left[\frac{B^{x-A} - B^{-(x-A)}}{B^{x-A} + B^{-(x-A)}}\right] \tag{12}$$

where x is the feed solution pH and A, B, C, and D are fitting parameters. The purpose of this fit was not to suggest a particular functional form for the data, but rather to obtain an estimate of the apparent p$K_a$, given by the pH at the inflection point (the parameter A). The location of the inflection point at pH ~4.7 is comparable to results obtained by other researchers from membranes modified by surface graft polymerization of PMAA.

Figure 16:
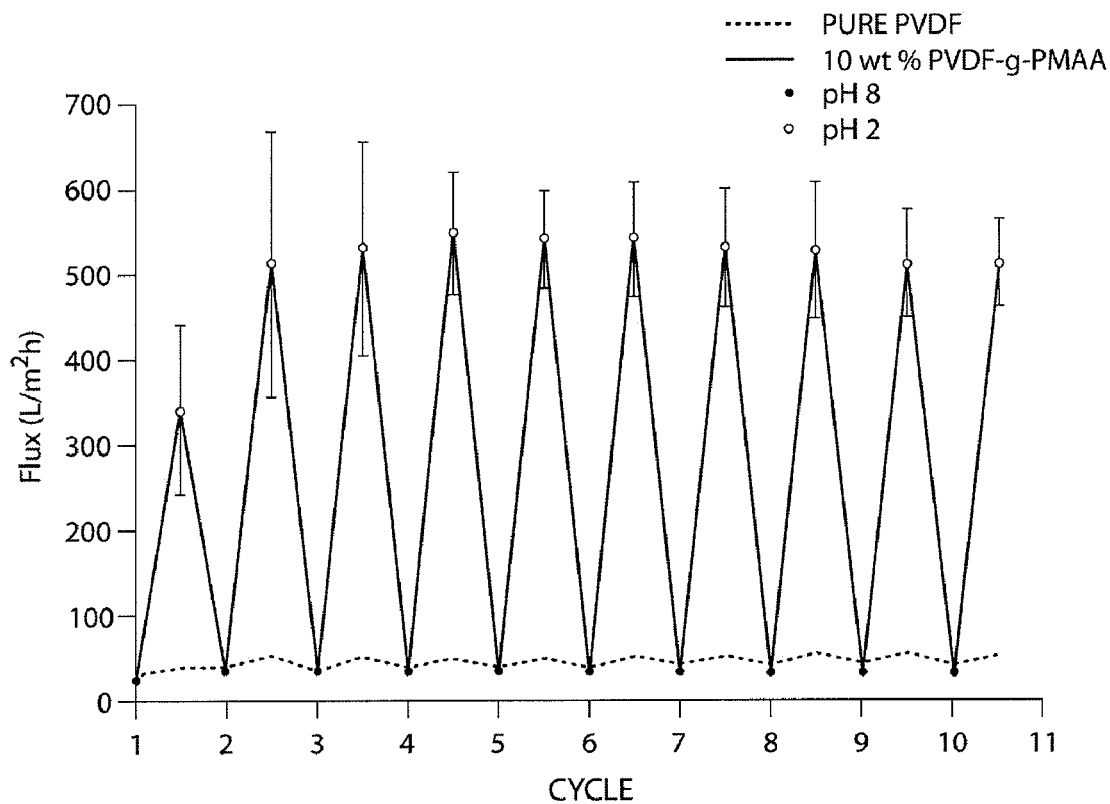
FIG. 16 shows reversibility of pH-responsive flux of buffer solution through an autoclaved pure PVDF membrane and autoclaved membranes having a bulk composition of 10 wt % PVDF-g-PMAA, as the pH of the feed was alternated between 8 and 2; each half-cycle consisted of a 1-min. filtration period for equilibration, followed by a gravimetric flux measurement taken over a second 1-min. period.

FIG. 16 shows the flux response of these self-organizing, environmentally responsive membranes as the pH of the feed solution was alternated between pH 8 and pH 2 over a 40-min. period. Again, the data points for the blend are averages of data collected from three separate membranes. After 1-2 equilibration cycles, during which reorganization of the membrane surface to express the PMAA side chains of the graft copolymer additive may have occurred, the flux response is completely reversible over this time period. Each half-cycle consisted of a 1-min. filtration period for equilibration, followed by a flux measurement over a second 1-min. period. Although no quantitative evaluation of the rapidity of the flux response was attempted, the flux was observed to change substantially within a few seconds following exchange of the filtration buffers.

This example demonstrates the utility of PVDF-g-PMAA as a blend component for the fabrication of PVDF membranes, wherein the graft copolymer enables the preparation of membranes having environmentally-responsive separation characteristics with no extra processing steps.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

The invention claimed is:

1. An article comprising:
    a microphase-separated comb polymer including microphase domains having a mean diameter of less than about 3 nm, the microphase-separated comb polymer comprising a poly(vinylidene fluoride) backbone repeat unit, wherein a plurality of the carbon atoms in the backbone are directly bonded to poly(ethylene glycol) methyl ether methacrylate side chains and water-absorbent microphase domains are provided by the side chains, and wherein the microphase-separated comb polymer backbone has a molecular weight no smaller than the molecular weight of a backbone of a corresponding parent polymer prior to bonding of the side chains.

2. The article of claim 1, wherein the water-absorbent microphase domains have a mean diameter of less than about 2 nm.

3. A membrane for water filtration, comprising the polymer of claim 1.

4. The article of claim 1, wherein the polymer is resistant to cell and protein adsorption such that the polymer adsorbs less than 90% of protein adsorbed by the corresponding parent polymer.

5. The article of claim 1, further comprising cell-binding ligands attached to between 1 and 100% of the side chains of the comb polymer.

6. The article of claim 5, wherein the cell-binding ligands are cell-signaling ligands.

7. The article of claim 5, wherein the cell-binding ligands are selected from the group consisting of adhesion peptides, cell-signaling peptides, and growth factors.

* * * * *